US011132275B2

(12) United States Patent
Mathews

(10) Patent No.: US 11,132,275 B2
(45) Date of Patent: Sep. 28, 2021

(54) ACCESSORY COMMUNICATION CONTROL

(71) Applicant: Apple Inc., Cupertino, CA (US)

(72) Inventor: Dennis Mathews, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 16/693,746

(22) Filed: Nov. 25, 2019

(65) Prior Publication Data

US 2020/0097380 A1 Mar. 26, 2020

Related U.S. Application Data

(63) Continuation of application No. 15/711,931, filed on Sep. 21, 2017, now Pat. No. 10,496,508.

(Continued)

(51) Int. Cl.
| | |
|---|---|
| *G06F 11/30* | (2006.01) |
| *H04L 29/06* | (2006.01) |
| *H04W 4/80* | (2018.01) |
| *H04W 4/06* | (2009.01) |
| *H04L 29/08* | (2006.01) |
| *H04W 12/37* | (2021.01) |
| *H04W 12/50* | (2021.01) |

(52) U.S. Cl.
CPC ........ *G06F 11/3051* (2013.01); *H04L 63/061* (2013.01); *H04L 67/02* (2013.01); *H04L 67/04* (2013.01); *H04L 67/303* (2013.01); *H04W 4/06* (2013.01); *H04W 4/80* (2018.02); *H04W 12/37* (2021.01); *H04W 12/50* (2021.01); *H04L 63/0428* (2013.01)

(58) Field of Classification Search
None
See application file for complete search history.

(56) References Cited

U.S. PATENT DOCUMENTS 5,059,871 A 10/1991 Pearlman et al.
5,086,385 A 2/1992 Launey et al.
(Continued)

FOREIGN PATENT DOCUMENTS

AU 2015214079 A1 8/2016
AU 2015214079 B2 9/2016
(Continued)

OTHER PUBLICATIONS

U.S. Appl. No. 16/140,450, "First Action Interview Pilot Program Pre-Interview Communication", dated Jan. 29, 2020, 10 pages.
(Continued)

*Primary Examiner* — Brian Whipple
(74) *Attorney, Agent, or Firm* — Kilpatrick Townsend & Stockton

(57) ABSTRACT

An accessory communication control protocol can facilitate faster and more secure transmission of status updates from an accessory to a controller (or network base station). An accessory can register with a controller, where the controller can provide some subscription and key generation information to the accessory. The accessory can detect changes to characteristics of the accessory and generate a broadcast notification that includes updates to the state of the characteristic. The broadcast notification can also include a counter, a device identifier, and a key. According to timing or rules, the accessory can transmit the broadcast notification to the controller without the need to establish a secure session with the controller.

22 Claims, 9 Drawing Sheets

Related U.S. Application Data

(60) Provisional application No. 62/514,699, filed on Jun. 2, 2017.

(56) References Cited

U.S. PATENT DOCUMENTS

| | | | |
|---|---|---|---|
| 5,471,190 A | 11/1995 | Zimmermann | |
| 5,621,662 A | 4/1997 | Humphries et al. | |
| 5,907,279 A | 5/1999 | Bruins et al. | |
| 6,150,921 A | 11/2000 | Werb et al. | |
| 6,249,680 B1 | 6/2001 | Wax et al. | |
| 6,631,271 B1 | 10/2003 | Logan | |
| 6,756,998 B1 | 6/2004 | Bilger | |
| 6,912,429 B1 | 6/2005 | Bilger | |
| 6,996,402 B2 | 2/2006 | Logan et al. | |
| 7,047,092 B2 | 5/2006 | Wimsatt | |
| 7,394,393 B2 | 7/2008 | Zhang et al. | |
| 7,574,417 B1 | 8/2009 | McGreevy et al. | |
| 8,042,048 B2 | 10/2011 | Wilson et al. | |
| 8,156,334 B2 | 4/2012 | Ho | |
| 8,261,089 B2 | 9/2012 | Leon Cobos et al. | |
| 8,375,118 B2 | 2/2013 | Hao et al. | |
| 8,516,087 B2 | 8/2013 | Wilson et al. | |
| 8,670,749 B2 | 3/2014 | Pratt, Jr. et al. | |
| 8,671,099 B2 | 3/2014 | Kapoor et al. | |
| 8,700,060 B2 | 4/2014 | Huang | |
| 8,737,917 B2 | 5/2014 | Desai et al. | |
| 8,750,797 B2 | 6/2014 | Ketari | |
| 9,544,075 B2 | 1/2017 | Altman et al. | |
| 9,549,375 B2 | 1/2017 | Dooley et al. | |
| 9,979,625 B2 | 5/2018 | McLaughlin et al. | |
| 10,206,170 B2 | 2/2019 | Mathews et al. | |
| 10,362,536 B2 | 7/2019 | Mathews et al. | |
| 10,496,508 B2 | 12/2019 | Mathews | |
| 2002/0095568 A1 | 7/2002 | Norris et al. | |
| 2002/0180581 A1 | 12/2002 | Kamiwada et al. | |
| 2003/0067386 A1 | 4/2003 | Skinner | |
| 2004/0023640 A1 | 2/2004 | Ballai | |
| 2004/0260407 A1 | 12/2004 | Wimsatt | |
| 2006/0265483 A1 | 11/2006 | Wang et al. | |
| 2006/0270457 A1 | 11/2006 | Lord | |
| 2008/0009324 A1 | 1/2008 | Patel | |
| 2008/0222711 A1 | 9/2008 | Michaelis | |
| 2008/0227393 A1 | 9/2008 | Tang et al. | |
| 2008/0229402 A1 | 9/2008 | Smetters et al. | |
| 2008/0238661 A1 | 10/2008 | Camp et al. | |
| 2009/0222659 A1 | 9/2009 | Miyabayashi et al. | |
| 2009/0307255 A1 | 12/2009 | Park | |
| 2009/0326800 A1 | 12/2009 | Kalaboukis et al. | |
| 2010/0019920 A1 | 1/2010 | Ketari | |
| 2010/0091818 A1 | 4/2010 | Sen et al. | |
| 2010/0188279 A1 | 7/2010 | Shamilian et al. | |
| 2010/0234051 A1 | 9/2010 | Holden et al. | |
| 2010/0262829 A1 | 10/2010 | Brown et al. | |
| 2011/0021142 A1 | 1/2011 | Desai et al. | |
| 2011/0153279 A1 | 6/2011 | Zhang et al. | |
| 2012/0054493 A1 | 3/2012 | Bradley | |
| 2012/0309410 A1 | 12/2012 | Marti et al. | |
| 2012/0324124 A1 | 12/2012 | Locker et al. | |
| 2013/0014232 A1 | 1/2013 | Louboutin et al. | |
| 2013/0029596 A1 | 1/2013 | Preston et al. | |
| 2013/0034230 A1 | 2/2013 | Takahashi | |
| 2013/0090061 A1 | 4/2013 | Linde | |
| 2013/0101121 A1 | 4/2013 | Nordholt et al. | |
| 2013/0169407 A1 | 7/2013 | Chen et al. | |
| 2013/0198516 A1 | 8/2013 | Fenton et al. | |
| 2013/0217333 A1 | 8/2013 | Sprigg et al. | |
| 2013/0225132 A1 | 8/2013 | Payan et al. | |
| 2013/0279698 A1 | 10/2013 | Bradley | |
| 2013/0304884 A1 | 11/2013 | Hymel | |
| 2014/0006587 A1 | 1/2014 | Kusano | |
| 2014/0022061 A1 | 1/2014 | Apte et al. | |
| 2014/0071895 A1 | 3/2014 | Bane et al. | |
| 2014/0085093 A1 | 3/2014 | Mittleman et al. | |
| 2014/0113558 A1 | 4/2014 | Varoglu et al. | |
| 2014/0118148 A1 | 5/2014 | Edlund et al. | |
| 2014/0143695 A1 | 5/2014 | Sundermeyer et al. | |
| 2014/0171114 A1 | 6/2014 | Marti et al. | |
| 2014/0187200 A1 | 7/2014 | Reitter et al. | |
| 2014/0210616 A1 | 7/2014 | Ramachandran | |
| 2014/0222954 A1 | 8/2014 | Vaccari et al. | |
| 2014/0317714 A1 | 10/2014 | Louboutin et al. | |
| 2014/0321297 A1 | 10/2014 | Yee et al. | |
| 2014/0364149 A1 | 12/2014 | Marti et al. | |
| 2014/0366105 A1 | 12/2014 | Bradley et al. | |
| 2015/0222517 A1 | 8/2015 | McLaughlin et al. | |
| 2015/0237071 A1 | 8/2015 | Maher et al. | |
| 2015/0334516 A1 | 11/2015 | Shon et al. | |
| 2015/0350031 A1 | 12/2015 | Burks et al. | |
| 2015/0350828 A1 | 12/2015 | Marti et al. | |
| 2015/0351038 A1 | 12/2015 | Dooley et al. | |
| 2015/0351145 A1 | 12/2015 | Burks et al. | |
| 2016/0092469 A1 | 3/2016 | Mukherjee et al. | |
| 2016/0360526 A1 | 12/2016 | Lehmann et al. | |
| 2017/0134171 A1 | 5/2017 | Woxland et al. | |
| 2017/0163477 A1 | 6/2017 | Zheng et al. | |
| 2017/0201942 A1 | 7/2017 | Mathews et al. | |
| 2017/0214592 A1 | 7/2017 | Wigard et al. | |
| 2017/0249267 A1 | 8/2017 | Muraleedharan et al. | |

FOREIGN PATENT DOCUMENTS

| | | |
|---|---|---|
| CN | 1516023 A | 7/2004 |
| CN | 101527911 A | 9/2009 |
| CN | 102387501 A | 3/2012 |
| CN | 105515853 A | 4/2016 |
| CN | 105981352 A | 9/2016 |
| CN | 106462123 A | 2/2017 |
| CN | 106664226 A | 5/2017 |
| CN | 105981352 B | 3/2018 |
| EP | 1125414 A2 | 8/2001 |
| EP | 1133120 A2 | 9/2001 |
| EP | 1381201 A2 | 1/2004 |
| EP | 1659739 A2 | 5/2006 |
| EP | 2148308 A2 | 1/2010 |
| EP | 2784986 A1 | 10/2014 |
| EP | 2881676 A1 | 6/2015 |
| EP | 3103246 | 12/2016 |
| EP | 3149547 | 4/2017 |
| EP | 3149548 | 4/2017 |
| EP | 3103246 B1 | 12/2017 |
| EP | 3313050 | 4/2018 |
| GB | 2339367 A | 1/2000 |
| JP | 2004236215 A | 8/2004 |
| JP | 2009212732 A | 9/2009 |
| JP | 5474238 B1 | 4/2014 |
| JP | 2017511028 | 4/2017 |
| JP | 6166484 B2 | 7/2017 |
| KR | 20160098522 A | 8/2016 |
| TW | 200937931 A | 9/2009 |
| TW | 201250481 A | 12/2012 |
| TW | 201540034 | 10/2015 |
| TW | I620430 | 4/2018 |
| WO | 2013049007 A1 | 4/2013 |
| WO | 2013174540 A1 | 11/2013 |
| WO | 2013184108 A1 | 12/2013 |
| WO | 2014004133 A1 | 1/2014 |
| WO | 2014020880 A1 | 2/2014 |
| WO | 2015120161 | 8/2015 |
| WO | 2015184382 | 12/2015 |
| WO | 2015184387 | 12/2015 |
| WO | 2015184382 A3 | 3/2016 |

OTHER PUBLICATIONS

"Notification of First Office Action," dated Apr. 14, 2020 in Chinese Application No. 2018800301486. 13 pages includes English translation.

"Notification of Second Office Action," dated Nov. 4, 2020 in Chinese Application No. 2018800301486. 10pages includes English translation.

"Patent Search Report," dated Apr. 14, 2020 in Chinese Patent Application No. 2018800301486. 11 pages (includes English translation).

(56) References Cited

OTHER PUBLICATIONS

"Accuware Indoor Navigation", Accuware, Available online at: www.accuware.com, 2015, 3 pages.
"Bluetooth Low Energy", Wikipedia, Available online at: http://en.wikipedia.org/wiki/Bluetooth_low_energy, Accessed from internet on Apr. 24, 2015, 9 pages.
"Bluetooth Low Energy", Wikipedia, Available online at: http://en.wikipedia.org/wiki/Biuetooth_low_energy, Apr. 24, 2015, 1 page.
"Bonjour Overview", Available online at: http://www.filibeto.org/unix/macos/lib/dev/documentation/Cocoa/Conceptual/NetServices/NetServices.pdf, May 23, 2006, 32 pages.
"Epson 802.11n/Bluetooth 2.1 Wireless Interfaces", Connect-It Wireless Interface Modules, Epson America, Inc., 2013, 2 pages.
"GATT Characteristics", Bluetooth Development Portal, Available Online at: https://developer.bluetooth.org/gatt/characteristics/Pages/CharacteristicsHome.aspx, Accessed from Internet on Apr. 24, 2015, 2 pages.
"GATT Descriptors", Bluetooth Development Portal, Available Online at: https://developer.bluetooth.org/gatt/descriptors/Pages/DescriptorsHomePage.aspx, Accessed from Internet on Apr. 24, 2015, 1 page.
"GATT Profiles", Bluetooth Development Portal, Available Online at: https://developer.bluetooh.org/gatt/profiles/Pages/ProfilesHome.aspx, Accessed from internet on Apr. 24, 2015, 1 page.
"GATT Services", Bluetooth Development Portal, [retrieved Apr. 24, 2015], retrieved from the Internet. 1 page. Available online at: https://developer.bluetooth.org/gatt/services/Pages/ServicesHome.aspx, Accessed from internet on Apr. 24, 2015, 1 page.
"GATT Specifications", Bluetooth Development Portal, Available Online at: http://developer.bluetooth.org/gatt/Pages.default.aspx, Accessed from Internet on Apr. 24, 2015, 1 page.
"Home Intelligence Advance User's Guide", Fibaro, 8.V111.2012 ver. 1.02\beta, Aug. 14, 2012, 101 pages.
"Indoor Navigation and Indoor Positioning Using Bluetooth", Infsoft, Available online at : http://www.insoft.com/blog/2015/indoor-navigation-and indoorpositioning- using-bluetooth, 2015, 2 pages.
"The Next Big Thing Indoor Location Beacon Tag & Solutions", Available online at: https://www.sticknfind.com/indoornavigation.aspx, Feb. 16, 2016, 5 pages.
"Tuxedo Touch WIFI Home Automation System", User Guide, Honeywell International Inc., Available online at : www.honeywell.com/security, Aug. 4, 2012, 48 pages.
U.S. Appl. No. 15/711,931, "First Action Interview Pilot Program Pre-Interview Communication", dated May 31, 2019, 4 pages.
U.S. Appl. No. 15/711,931, "Notice of Allowance", dated Jul. 31, 2019, 10 pages.
Agrawal, et al., "Bluetooth Navigation System Using Wi-Fi Access Points", School of Electronics Engineering, VIT University, Vellore, 2011, 8 pages.
Alexandra, "Bluetooth Low Energy Solution Released Accurate Real-Time Indoor Localization", Available online at: http://indoo.rs/bluetooth-low-energy-solution, Nov. 27, 2015, 3 pages.
Andersson, "Use Case Possibilities With Bluetooth Low Energy in Lot Applications", White Paper, Available online at: www.ublox.com, May 20, 2015, 16 pages.
Asensio, et al., "Protocol and Architecture to Bring Things into Internet of Things", Hindawi Publishing Corporation, International Journal of Distributed Sensor Networks, vol. 2014, Article ID 158252, Apr. 13, 2014, 19 pages.
Bekkelien, "Bluetooth Indoor Positioning", Master of Computer Science, University of Geneva, Mar. 2012, 56 pages.
CN201580007365.X, "Notice of Decision to Grant", dated Jan. 16, 2018, 4 pages.
CN201580007365.X, "Office Action", dated Mar. 3, 2017, 29 pages.
CN201580007365.X, "Office Action", dated Oct. 10, 2017, 8 pages.
Dao, et al., "Home Appliance Control System Based on Robust Indoor User Localization Using Wifi Signals", International Journal on Human Machine Interaction, vol. 1, Issue 1, 2013, 10 pages.
Echevarria, et al., "WebTag: Web Browsing into Sensor Tags over NFC", Sensors, vol. 12, 2012, pp. 8675-8690.
EP17190748.8, "Extended European Search Report", dated Mar. 22, 2018, 4 pages.
Epson, "Connect-It Wireless Interface Modules", Epson 802.11n/Bluetooth 2.1 Wireless Interfaces, 2013, 2 pages.
Fielding, et al., "Principled Design of the Modern Web Architecture", ACM Transactions on Internet Technology, vol. 2, No. 2, May 2002, pp. 115-150.
Fouladi, et al., "Security Evaluation of the Z-Wave Wireless Protocol", Available online at: http://neominds.org/download/zwave_wp.pdf, Oct. 5, 2012, 6 pages.
Han, et al., "On the Energy Efficiency of Device Discovery in Mobile Opportunistic Networks: A Systematic Approach", IEEE Transaction on Mobile Computing, vol. 14, Issue 4, Jun. 23, 2015, 14 pages.
Isomaki, et al., "On Interworking Between Rapidly Evolving Internet of Things and Open Web Platform", Word Wide Web Consortium, Available Online at: http://www.w3.org/2014/02/woUpapers/isomaki.pdf>, Feb. 20, 2014, 5 pages.
Koch, et al., "Hardware/Software Solution Unifying DALI, IBECS, and BACnet Final Report", Lawrence Berkeley National Laboratory, 2004, 25 pages.
La Delfa, et al., "Accurate Indoor Navigation Using Smartphone, Bluetooth Low Energy and Visual Tags", Department of Electrical, Electronics and Computer Engineering (DIEEI) University of Catania, Italy, 2014, 4 pages.
Navizon, "Navizon Indoor Triangulation System (I.T.S.)", Available on online at: www.navizon.com, 2015, 2 pages.
PCT/US2018/025084, "International Search Report and Written Opinion", dated Jul. 11, 2018, 11 pages.
Rosenberg, "A Data Model for Presence", Cisco Systems, Available online at: https://tools.ietf.org/html/rfc4479, Jul. 2006, 35 pages.
Shelby, et al., "The Constrained Application Protocol (CoAP)", Internet Engineering Task Force (IETF), Jun. 2014, 112 pages.
Skelton, "Fibaro Z-Wave Home Center 2 Mega Review", Available Online at: http://www.automatedhome.co.uk/reviews/fibaro-z-wave-home-center-2-mega-review.html, Sep. 10, 2012, 39 pages.
Tarkoma, et al., "Smartphone Energy Consumption", Cambridge University Press, 2014, 7 pages.
Townsend, "Introduction to Bluetooth Low Energy", Product Guide, Available Online At: https://learn. adafru it.com/introdu ction-to-bluetooth-lowenergy/introduction?gclid=EAI aiQobChMij5u_ Om21 g IVBKhpChOTwg 19EAAYASAAEgLI_fD_BwE, Apr. 17, 2014, 11 pages.
Wu, "The Secure Remote Password Protocol", Computer Science Department, Internet Symposium on Network and Distributed System Security, Stanford University, Nov. 11, 1997, 17 pages.
"Notification of Third Office Action," dated Mar. 31, 2021 in Chinese Patent Application No. 2018800301486. 6 pages (includes English translation).

ACCESSORY COMMUNICATION CONTROL

CROSS-REFERENCE TO RELATED APPLICATIONS

The present application is a continuation of U.S. patent application Ser. No. 15/711,931, filed Sep. 21, 2017, entitled "Accessory Communication Control," which claims the benefit of and priority to U.S. Provisional Application No. 62/514,699, filed Jun. 2, 2017, entitled "Accessory Communication Control." The entire contents of which are incorporated herein by reference for all purposes. This application is related to U.S. Non-Provisional application Ser. No. 15/274,437, filed Sep. 23, 2016, entitled "Dynamic Connection Path Detection and Selection for Wireless Controllers and Accessories," (now U.S. Pat. No. 10,206,170), which claims priority to U.S. Provisional Application No. 62/276,810, filed Jan. 8, 2016 and is also related to International Application No. PCT/US15/14639 filed Feb. 5, 2015, entitled "Uniform Communication Protocols for Communication Between Controllers and Accessories," which is a continuation of U.S. Non-Provisional application Ser. No. 14/614,914, filed Feb. 5, 2015, entitled "Uniform Communication Protocols for Communication between Controllers and Accessories" (now U.S. Pat. No. 9,979,625) which claims priority to U.S. Patent Provisional Application No. 61/935,967 filed Feb. 5, 2014, the disclosures of which are incorporated by reference herein in their entirety.

BACKGROUND

Network-connected electronic devices are becoming increasingly popular in a range of applications within a building. The network-connected devices can be used to control and/or sense equipment and/or activities that occur within the building. Examples of such devices include wireless light switches and/or light bulbs, thermostats that can be controlled remotely, doors that can sense when they are open or closed, etc. Each of these devices is usually connected to a local network within the building, which may or may not be connected to the Internet. The local network enables each device to be controlled by some other device or at least enables the ability for the device to report its status to some other device. For example, a network-connected door sensor may be programmed to report when it has been opened to a controller or central hub. The controller or central hub may be programmed to perform some sort of action up on receipt of the report. One might program a controller to turn on network-connected lights in the building (e.g., lights in the entryway or living room of a house) after the door is opened.

However, latency between these network-connected devices can be a problem. For example, latency can be a concern when the devices are configured to conduct a handshake operation with each other and/or are configure to secure the data that is being transmitted. In some cases, a user may activate a light switch and have to wait three to four seconds before the light turns on.

SUMMARY

As discussed, latency between network-connected devices can be a real problem, causing frustration and dissatisfaction of consumers. In some instances, latency (e.g., unresponsiveness or slow responsiveness) in general is an indicator of response time, e.g., how it long it takes for a device to respond or to perform an action in response to a request. A high latency indicates that the response time is long (or at least longer than expected), while a low latency indicates a quick (or at least, quicker) response. With respect to network-connected devices, users expect very low latency when requesting that the devices perform operations. For example, if a user selects a button or switch to turn a light on, the latency should be low enough (e.g., less than 1 second) that the user isn't waiting for the light to turn on. Thus, latency (more specifically) can be an indicator of the amount of time it takes between when an accessory provides a notification and when a controller recognizes the information included in the notification. In some examples, the button/switch may be user-programmable such that a user can define an action to be performed by a controller. When the user activates the button, the button can send an event to the controller that can, in turn, trigger the action (e.g., to turn on a light, or other electronic device). The action may include the controller sending instructions to the light, instructing the light to turn on.

Because of the nature of network-connected devices, data is sent from one device to another in order to effectuate requested operations (e.g., automations based on the information in the notifications). Thus, in the light switch example, the switch and another device (e.g., a controller) would share information (e.g., the information sent to the controller would indicate that the switch was activated), and an instruction would eventually be sent by the controller to a light bulb, to instruct the light bulb to turn on (or, electricity may be sent to the lightbulb so that it turns on). In this example, low latency would indicate that the controller was able to quickly (e.g., very few milliseconds) identify the information from the accessory that indicates that the switch was activated. However, if a handshake operation is to be performed and/or a secure session is to be established, high latency associated with the communication of information between devices may cause the devices to lose a connection or respond too slowly. In some cases, if one connected device has not received an acknowledgement or other information from the other connected device within a certain period of time, the waiting device might be instructed to drop the connection or to try to establish a new one. In these cases, operability of the network-connected devices can be seriously degraded when latency is high.

Certain embodiments of the present disclosure relate to an accessory communication control protocol that will alleviate high latency issues by establishing a communication workflow that may not rely on handshaking or the establishment of secure sessions, while still protecting the data that is to be transmitted. For example, a network-connected device with a sensor may be able to communicate a status change (or a heartbeat) to a controller device or network hub (e.g., a base station) without having first established a connection with the controller device. In this way, a single broadcast can be used to report the status change, as long as the two devices are instructed about the communication workflow.

In some examples, a controller device (or "controller") may communicate with any number of other electronic devices that are to be controlled (referred to herein as "accessory devices" or simply "accessories"). A controller can be implemented, for example, on a general-purpose computing device such as a desktop computer, laptop computer, tablet computer, mobile phone, smart television (TV) device, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Other examples of accessories include door sensors, motion sensors, buttons (e.g., network-connected switches or other contact sensors), and so on. Accessories and controllers can communicate with each other via wired or wireless channels using standard transport protocols such as Wi-Fi, Bluetooth, Bluetooth LE, or the like.

In some embodiments, an accessory communication control protocol can define a simple and extensible framework for defining an accessory as a collection of services, with each service being defined as a set of characteristics, each of which has a defined value at any given time. The characteristics can represent various atomic aspects of the accessory's state. For example, in the case of a thermostat, characteristics can include power (whether the thermostat unit is on or off), current temperature (actual temperature measured by the thermostat), and target temperature (a settable temperature the thermostat seeks to maintain). In some instances, a heartbeat (e.g., a status notification that indicates that the device sending the heartbeat is active) is a characteristic. The protocol can further define message formats usable by a controller to send command-and-control messages (requests) to the accessory and for the accessory to send response messages. The requests can allow the controller to interrogate (e.g., read) accessory characteristic and in some instances to modify (e.g., write to) accessory characteristics; for example, a controller can read a power characteristic to determine whether the accessory is on or off and can write to the power characteristic to turn the accessory off or on. Accordingly, any type of accessory, regardless of function, can be controlled by sending appropriate requests. An accessory can provide an accessory definition record to a controller. The accessory definition record can include complete information about all accessible characteristics of the accessory. A controller can use the accessory definition record in determining how to interact with the accessory. For example, information from the accessory definition record can be used by the controller to construct a user interface for operating the accessory as well as to construct request messages to the accessory. In some cases, the accessory definition record may be provided to the controller when the accessory is registered with the controller and/or the network.

In some embodiments, the protocol can further define notification mechanisms that an accessory can use to notify a controller when a characteristic changes. Examples include passive notification mechanisms, in which the controller can query the accessory as to whether any characteristics have changed; as well as active or event-based notification mechanisms, in which the accessory can selectively generate messages to one or more controllers when a particular characteristic changes. Multiple notification mechanisms can be concurrently supported, and a controller can select a notification mechanism to be used for a particular accessory, service, or characteristic. Additionally, multiple active notification mechanisms can be concurrently supported, such that an accessory can use a first active notification mechanism and a second active notification mechanism (e.g., when the accessory does not know which mechanism the controller will support).

The following detailed description together with the accompanying drawings will provide a better understanding of the nature and advantages of the present disclosure.

DETAILED DESCRIPTION

In some examples, a controller device (or "controller") may communicate with any number of other electronic devices that are to be controlled (referred to herein as "accessory devices" or simply "accessories"). A controller can be implemented, for example, on a general-purpose computing device such as a desktop computer, laptop computer, tablet computer, mobile phone, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Other examples of accessories include door sensors, motion sensors, buttons (e.g., network-connected switches), and so on. Accessories and controllers can communicate with each other via wired or wireless channels using standard transport protocols such as Wi-Fi, Bluetooth, Bluetooth LE, Ethernet, 3GPP LTE, or the like or versions or evolutions thereof.

Example Environment

Figure 1:
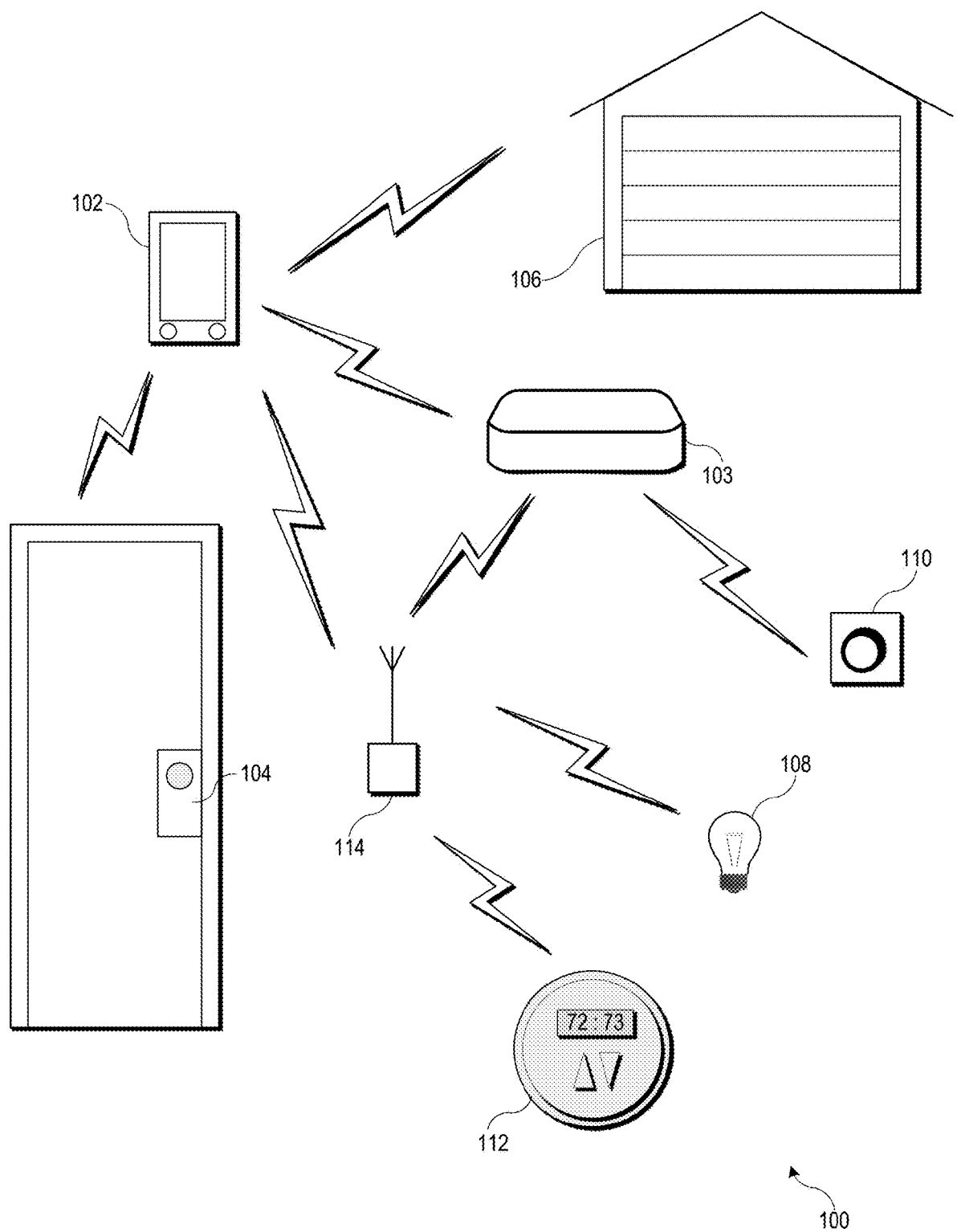
FIG. 1 shows a home environment according to an embodiment of the present disclosure.

FIG. 1 shows a home environment 100 according to an embodiment of the present disclosure. Home environment 100 includes a controller 102 that can communicate with various accessory devices (also referred to as "accessories") located in environment 100. Controllers 102 and 103 can be, for example, a desktop computer, laptop computer, tablet computer, smart phone, smart speaker, wearable computing device, personal digital assistant, television set top box, or any other computing device or set of devices that is capable of communicating command-and-control messages to accessories as described herein and presenting a user interface to allow a user to indicate desired operations on the accessories (e.g., using a television or other display when the controller is a set top box). In some embodiments, controllers 102, 103 can be implemented using multiple discrete devices. For example, there can be a base station (e.g., a smart TV or other device acting as a network hub) such as controller 103 that communicates with accessories, which can be installed in a fixed location in environment 100 and one or more mobile remote-control stations (e.g., a handheld or wearable device such as a mobile phone, tablet computer, smart watch, eyeglasses, etc.) such as controller 102 that provide a user interface and communicate with the base station to effect control over accessories. In some examples, as noted, controller 103 can be a base station that facilitates communication between other controllers (e.g., controller 102 or other controllers) and the accessories via a WiFi network or the like.

Any type of accessory device can be controlled. Examples of accessory devices include door lock 104, garage door system 106, light fixture 108, switch (e.g., button) 110, and thermostat 112. In some instances, controllers 102, 103 can communicate directly with an accessory; for instance, controller 102 is shown communicating directly with door lock 104 and garage door system 106 while controller 103 is shown communicating directly with switch 110. In other instances, controllers 102, 103 can communicate via an intermediary. For instance, controllers 102, 103 are shown communicating via a wireless network access point 114 with accessories 108, 112 that are on a wireless network provided by access point 114. For example, access point 114 can be a WiFi router or other network interface, or it can be another device that can act as a WiFi router (e.g., a hotspot), receiving a WiFi signal from a router and connecting one or more other devices to the router by transmitting its own WiFi signal and/or short-range signals (e.g., Bluetooth or the like). As noted above, in some embodiments, controller 103 can act as the base station; however, base station functionality can be integrated into any controller (e.g., controller 102); for example, when a home is not equipped with a device like controller 103.

Various communication transports and combinations of transports can be used, and different transports can be used with different devices. One example of a communication transport can be a transport conforming to Bluetooth® communication standards and protocols defined and promulgated by Bluetooth SIG, Inc. (http://www.bluetooth.com); the term "Bluetooth" as used herein refers generally to Bluetooth® communication standards and protocols, and the term "Bluetooth LE" as used herein refers to the Bluetooth® Smart communication standards and protocols. Bluetooth protocols can support direct point-to-point communication between devices within a limited range. Another example of a communication transport can be a transport conforming to Wi-Fi® communication standards and protocols defined and promulgated by the Wi-Fi Alliance® (http://www.wi-fi.org); as used herein "Wi-Fi" refers generally to Wi-Fi® standards and protocols. Wi-Fi protocols can define a wireless network with a central access point that routes communications between different devices on the network. The network can support a standard Internet protocol (IP) suite including, e.g., Transmission Control Protocol (TCP) and Hypertext Transfer Protocol (HTTP). It is to be understood that Bluetooth and Wi-Fi are used as examples of communication transports and protocols; other transports and protocols can also be used. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can act as a bridge, delivering the messages to light bulb 108 via the wired connection. Other combinations of wired and wireless communication are also possible.

Further, while two controllers 102, 103 are shown, home environment 100 can have multiple controller devices. For example, each person who lives in the home may have one or more personal devices (e.g., mobile phone, tablet, laptop, wearable device) that can act as controllers for some or all of accessories 104-112. Different controller devices can be configured to communicate with different subsets of the accessories; for example, a child's controller might be blocked from modifying settings on thermostat 112, while a parent's controller device is permitted to modify the settings. Such permissions can be configured by settings of the controller devices.

Certain embodiments of the present disclosure relate to an accessory communication control protocol that facilitates communication by accessories such as any one of accessories 104-112 with one or more controllers such as controllers 102, 103. The protocol can provide a simple and extensible framework that models an accessory as a collection of services, with each service being defined as a set of characteristics, each of which has a defined value at any given time. The characteristics can represent various atomic aspects of the accessory's state. For example, in the case of thermostat 112, characteristics can include power (whether the thermostat is on or off), current temperature measured by thermostat 112, and target temperature to which thermostat 112 is set. Examples of accessory models using services and characteristics are described below.

The protocol can further define message formats usable by accessories (e.g., thermostat 112) to send updates of characteristic state as part of a broadcast notification or other packet to be sent to controllers (e.g., controllers 102, 103). In some examples, the broadcast notification can be provided instead of a handshake and/or before a handshake is performed between the reporting accessory and the receiving controller. Thus, the protocol enables a logical broadcast session in advance of any actual connections between the devices. The broadcast notification can include the updated state information as well as other data that can be used by the controller to authenticate and/or verify that the data is accurate and/or for a registered accessory. The broadcast notification may also be provided instead of or prior to establishing a secure connection with the controller. Additional details regarding the broadcast notification will be described below.

In some examples, command-and-control messages can be sent by a controller to allow the controller to interrogate (e.g., read) the current state of accessory characteristics and in some instances to modify (e.g., write to) accessory characteristics. For example, modifying the power characteristic of thermostat 112 can turn thermostat 112 off or on. Accordingly, any type of accessory, regardless of function or manufacturer, can be controlled by sending appropriate messages. Additionally, in some embodiments, an accessory can provide an accessory definition record to a controller. The accessory definition record can include complete information about all accessible characteristics of the accessory. A controller can use the accessory definition record in determining how to interact with the accessory. For example, the controller can use information from the accessory definition record to construct a user interface for operating the accessory as well as to construct request messages to the accessory. The accessory definition record may be received at the controller during a registration phase of the accessory device, as opposed to during establishment of a secure session or during a handshake between the accessory and the controller.

The protocol can further define notification mechanisms that allow accessory 112 (or other accessories) to selectively notify controllers 102, 103 in the event of a state change. Examples include passive notification mechanisms, in which controllers 102, 103 can query an accessory (e.g., accessory 112) to find out whether any characteristics have changed; as well as active, advertised, or event-based notification mechanisms, in which accessory 112 (or other accessories) can selectively generate messages (e.g., broadcast notifications) to one or more controllers and/or broadcast an advertisement when a particular characteristic changes or when a status update is to be provided (e.g., some status updates do not identify any characteristic or state changes). Multiple notification mechanisms can be concurrently supported, and a controller can select a notification mechanism to be used for a particular accessory, service, or characteristic. Additionally, the accessories may select the notification mechanism to be used or may be instructed regarding which notification mechanism to use. Examples are described below.

In some embodiments, communication with a given accessory can be limited to authorized controllers. The protocol can specify one or more mechanisms for establishing a "pairing" between controllers 102, 103 and a given accessory (e.g., door lock accessory 104) under circumstances that provide a high degree of confidence that the user intends for controllers 102, 103 to be able to control accessory 104, and a controller that has established a pairing with a particular accessory can be considered authorized for that accessory. Pairing can be established, e.g., by establishing a secure cryptographic framework using short-term keys and an out-of-band shared secret. Long-term public keys for the accessory and controller can be exchanged within this framework, and the accessory and controller can persistently store the exchanged keys, thereby establishing the pairing. After the pairing is established, accessory 104 is able to verify whether received communications are from paired controllers 102, 103 or another device, and accessory 104 can reject any communications that are not from paired controllers 102, 103 (and vice versa). For example, when an accessory and controller that previously established a pairing reconnect, they can verify the previous pairing (e.g., by proving that each possesses the other's long-term public key) and generate session-specific encryption keys to use for communication within a pair-verified session (e.g., a secure session). In some embodiments, multiple controllers can establish pairings with the same accessory, and the accessory can accept and respond to communications from any of its paired controllers while rejecting or ignoring communications from unpaired controllers.

In some examples, each of accessories 104-112 may be configured to register with one of controllers 102, 103. Registration may be a one-time procedure, where the accessory provides some information about its characteristics, and the controller provides some information regarding characteristics or characteristic types for which the controller will register. Registering for a characteristic and/or type may include providing a list of identifiers that identify the particular characteristics or characteristic types about which the controller is requesting to be updated. For example, accessory 112 is a thermostat, which means that it can include more than one characteristic. It can sense the current temperature in the room, it can turn on the heater or air conditioner, and it can sense when a user has requested that the temperature in the room be adjusted (e.g., by selection of a button on thermostat 112), among other things. Each of these characteristics may correspond to a particular instance identifier, and each of these instance identifiers may have a status (e.g., on or off) or a value (e.g., a temperature reading, or brightness value in the case of light 108). A heartbeat may have its own instance ID as the heartbeat is modeled as a characteristic of accessories 104-112.

In some examples, controllers 102, 103 may only be configured to receive status updates that correspond to the temperature in the room going above or below a threshold. Controllers 102, 103 may then be able to perform an action (e.g., turn the heater or air conditioner on, present the room temperature on a user interface (UI) to a user, etc.) based at least in part on the receipt of the status update. Thus, in this example, controllers 102, 103 could register for this characteristic or type by providing an instance identifier that corresponds to that characteristic or type. Registration of a type as opposed to a characteristic enables controllers 102, 103 to register for multiple characteristics that all fall under the umbrella of a certain type. For example, temperature threshold might be a type of characteristic that would cover both the upper threshold characteristic (e.g., when the temperature exceeds a number) and the lower threshold characteristic (e.g., when the temperature goes below a number). When controllers 102, 103 are configured to perform an operation in response to receipt of a status update in a broadcast notification, this information may also be provided during registration. For example, if controllers 102, 103 are configured to turn on a light (e.g., accessory 108) once a user activates a switch (e.g., switch accessory 110), this is considered an automation (e.g., of controllers 102, 103). In some cases, when controllers 102, 103 are configured with an automation, controllers 102, 103 can instruct the appropriate accessory during registration (in this example, switch accessory 110) to always report changes in the state of the characteristic (e.g., "on" or "off") immediately. Here, switch accessory 110 would generate a broadcast notification and provide it to either or both of controllers 102, 103 immediately upon detecting the status change. In some cases, only controller 103 (e.g., the home hub) will perform automations. In this case, if an automation is configured, but controller 102 receives the broadcast notification instead of controller 103, controller 102 can be configured to send the broadcast notification to controller 103 either over WiFi (e.g., through access point 114) or over Bluetooth (or the like). However, when no automation exists, accessories may not transmit the broadcast notification immediately. Instead, accessories 108-112 may only report status updates based at least in part on a schedule (e.g., every few seconds or the like), randomly, or to identify a low battery or that the accessory is still active. In some examples, accessories 108-112 may be configured to report status updates either every 1.28 seconds or every 2.5 seconds, depending on the type of device (e.g., low power devices), remaining battery power available, type of characteristic (e.g., characteristics that are not important or that change often), etc. When accessories 104-112 register with controllers 102, 103, controllers 102, 103 can instruct each accessory how often status updates for each characteristic are required. This information can also be transmitted to the accessories 104-112 after each new key generation (see below for more details on key generation). Thus, the timing for reporting updates for each characteristic can change. Additionally, this information can be configured by a user of the devices 102-112.

In certain embodiments, an accessory may be configured to implement features of the accessory communication control protocol described herein once the accessory is registered with a controller. Based on this protocol, the accessory can bypass or otherwise avoid implementing a pair-verified session or any secure session that includes a handshake or other established connection. In other words, when the accessory determines that a status update is to be reported (e.g., a characteristic for which the controller is registered changes), the accessory can generate a broadcast notification that includes the status update without first advertising that an update is available. This can provide significant improvements to the latency of the system (e.g., the time it takes between when an status change is identified and when the controller is able to act on it) and can enable low and super-low powered accessories to save significant battery power. By implementing the accessory communication control protocol, the entire round-trip session generation (e.g., handshake and/or pair-verification) can be avoided, and low-power accessories can sleep for a long time without using battery to maintain a connection during times when there is nothing to report. Additionally, in order to ensure backwards compatibility, the accessories may be configured to implement the accessory communication control protocol and then, after the broadcast notification is transmitted, the accessory may implement a potentially prior-used method: transmit an advertisement, establish a secure session (e.g., a pair-verified session), and then transmit the payload (e.g., the status update information) via the secure session. Additional details of the accessory communication control protocol will be described below.

It will be appreciated that home environment 100 is illustrative and that variations and modifications are possible. Embodiments of the present disclosure can be implemented in any environment where a user wishes to control one or more accessory devices using a controller device, including but not limited to homes, cars or other vehicles, office buildings, campuses having multiple buildings (e.g., a university or corporate campus), etc. A controller can be any device that is used to control one or more other devices (accessories), and an accessory can be any device that allows some or all of its operations to be controlled by a controller, or that provides sensory information (e.g., an indication of something that has been sensed by a sensor) to a controller. Controller 102 can implement or include any or all of the features described herein as being implemented or included in a controller, and accessories such as accessories 104-112 can implement or include any or all of the features described herein as being implemented or included in an accessory.

In some embodiments, controller 102 can communicate with an accessory (e.g., accessory 108) from a remote location (e.g., anywhere in the world). For example, while located in a remote environment, controller 102 can communicate via a wide-area network (e.g., the Internet) with a server that has the ability to relay messages to accessory 108 (e.g., by communicating with access point 114 and/or controller (base station) 103 located in environment 100, which can communicate locally with accessory 108). The content of the communication between controller 102 and accessory 108 can be opaque to the server, and the server can simply pass along the encrypted data while remaining agnostic as to its content. Thus, accessories can be operated locally (e.g., by a controller able to establish a direct communication path to the accessory) or remotely (e.g., by a controller that communicates indirectly via a relay server or the like).

Example Broadcast Notification

As noted above, implementing the accessory communication control protocol includes configuring an accessory to include the payload within an initial broadcast notification. This broadcast notification will be provided before and/or in lieu of a secure session being established between the accessory and a controller. However, the broadcast notification may need to securely provide the status update in a way that is protected from malicious intent and while notifying the controller that an update is available. Previously, the controller would be notified of an update by an advertisement that did not include the payload. However, this may cause too much latency and uses too much battery power of the accessory.

Figure 2:
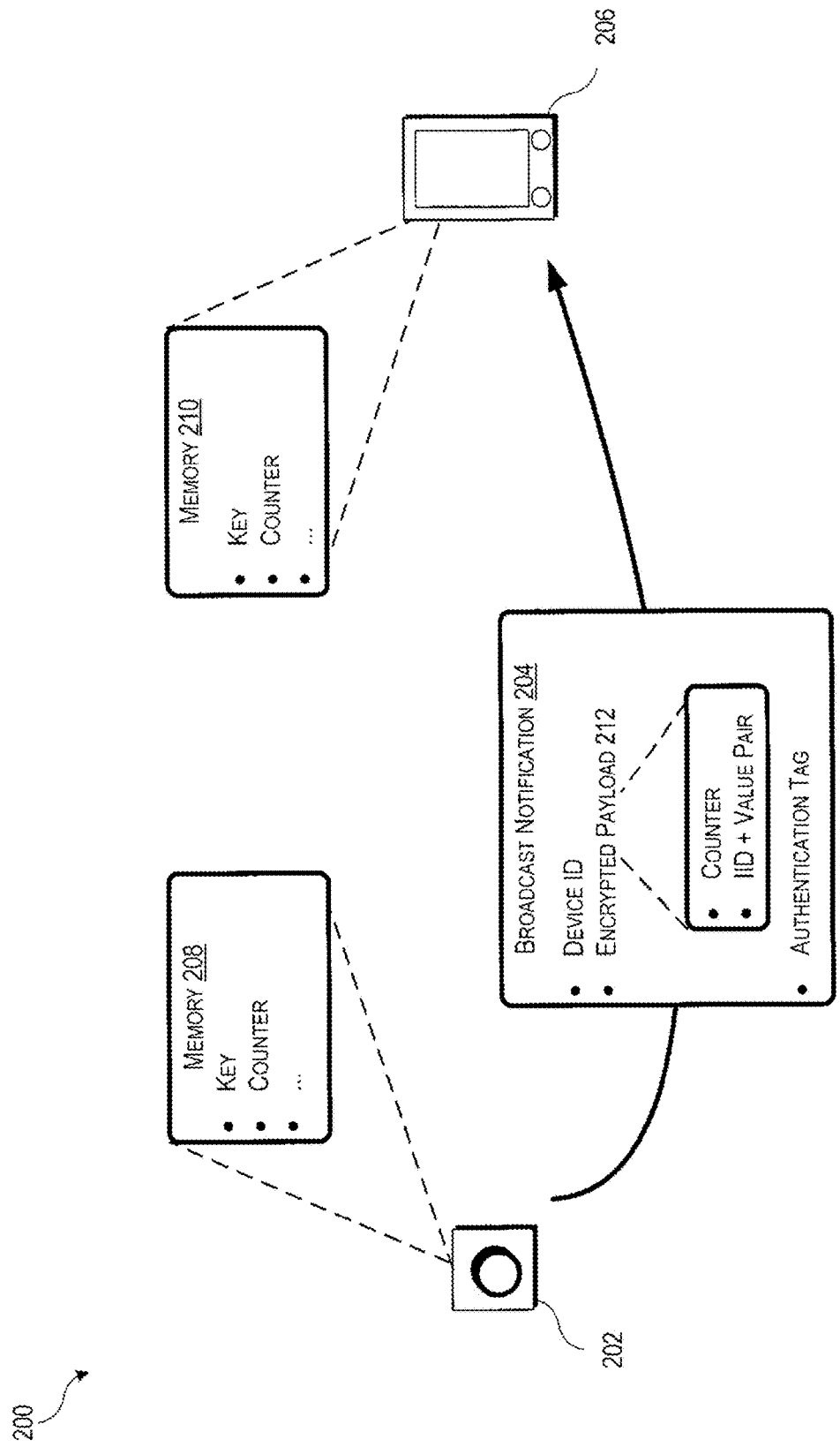
FIG. 2 is a simplified block diagram of a broadcast notification according to an embodiment of the present disclosure.

FIG. 2 is shows an example environment 200, where an accessory 202 can provide a broadcast notification 204 to a controller 206. In some embodiments, accessory 202 may include memory 208 configured to store computer-executable instructions for operation as well as a security key and a global counter value for building broadcast notification 204. Additionally, controller 206 may include memory 210 configured to store computer-executable instructions for operation as well as a security key and global counter value for accessory 202. If controller 206 is configured to control multiple different accessories, it may store multiple sets of key/counter pairs (e.g., one for each accessory). In the example shown in FIG. 2, the key and the global counter are the same at least because the key/counter pair stored in memory 210 is associated with accessory 202 and because the two devices are currently synchronized (e.g., keys have been generated using a matching security protocol and the counters have incremented in unison). In some examples, broadcast notification 204 will include a device identifier that uniquely identifies the accessory and encrypted payload 212. The device identifier can be provided to accessory 202 by controller 206 during the registration phase, or at any time. For security, the device identifier can be randomly generated by controller 206. Controller 206 can store (e.g., in a lookup table or other type of data structure) an association between the actual accessory identifier (e.g., the media access control (MAC) address) and the device identifier that was randomly generated by controller 206. When broadcast notification 204 is received by controller 206, controller 206 can use the device identifier to initially identify which accessory is providing the broadcast. Additionally, encrypted payload 212 may include a few elements. For example, encrypted 212 payload can include a state number or counter value (e.g., a global state counter), a list of instance identifiers and associated values (e.g., the identifier of each characteristic that changed and what each new value is), and an authorization tag.

In some examples, the key is used to encrypt the payload. Upon encryption of the payload, an authorization tag can be generated to sign the message. In some instances, the authentication tag is a hash value that is generated to authenticate the message. For example, the authentication tag can be generated and appended to encrypted payload 212 so that it is part of broadcast notification 204. Once controller 206 receives broadcast notification 204, and decrypts it, controller 206 can generate its own version of the authentication tag using the hash as that of accessory 202. If the authentication tag generated by controller 206 matches the authentication tag appended to encrypted payload 212 (e.g., the authentication tag that accessory 202 generated using the hash), then controller 206 will know that nothing in encrypted payload 212 has been altered.

The state number, which is included in encrypted payload 212, is a global state counter that is maintained by both accessory 202 and controller 204. Both devices can increment the counter every time an update is provided. Additionally, the state counter is used with the key to both encrypt and decrypt the payload. However, a counter/key combination will never repeated. Because the state counter is maintained by both devices, it can be included in the encrypted payload without being shared separately. Use of the state counter protects against replay attacks. If broadcast notification 204 is replayed by a third-party, controller 206 will know because the state counter will not have been incremented. Encrypted payload 212 also includes a list of instance identifiers and associated values. An example of an instance identifier and value includes identification of a characteristic of the accessory and the new state (e.g., on, off, or some non-binary value such as a temperature or brightness value). Multiple different identifier/value pairs can be provided in a single broadcast notification so that more than one update can be provided by accessory 202 at the same time. The authorization tag (e.g., the key) is also included in encrypted payload 212. Much like the counter value, the key is generated and maintained by each device individually. In some examples, upon registration of accessory 202 with controller 206, controller 206 may provide information that identifies a hashing algorithm for generating the key. A public/private pair key generation mechanism can be used by both devices. Information about the particular algorithm and mechanism can be provided by controller 206 to accessory 202 so that they both use the same mechanism to generate matching keys. As noted, the key will be used by accessory 202 along with the state counter (e.g., nonce) to encrypt the payload upon generation of broadcast notification 204. Upon generation of broadcast notification 204, accessory 202 can transmit broadcast notification 204 to controller 206 and increment the counter. In some cases, controller 206 can acknowledge receipt of broadcast notification 204 by transmitting a receipt acknowledgement indicator (e.g., "ack") to accessory 202. In some cases, controller 206 acknowledges receipt by attempting to initiate a secure connection with accessory 202. Even though the two devices don't intend to "connect," the pseudo-acknowledgement can act as an indicator to accessory 202 that broadcast notification 204 was received by controller 206. In some instances, when accessory 202 receives the "ack" or the "pseudo-ack" (e.g., the connection initiation/request), accessory 202 can be configured to end communications with controller 206 (e.g., it may not perform the fallback procedures described below, e.g., at blocks 414 and 418 of FIG. 4). This can provide a significant power savings for accessory 202. For example, it is able to skip a few computational steps and data transmissions, thus reducing battery consumption. For each different accessory, a particular controller may need to keep track of respective information (e.g., device ID, counter, key, instance IDs, etc.). This information can be stored in a table on each controller, on a hub, or on a server.

Example Accessory Communication Control Flows

Figure 3:
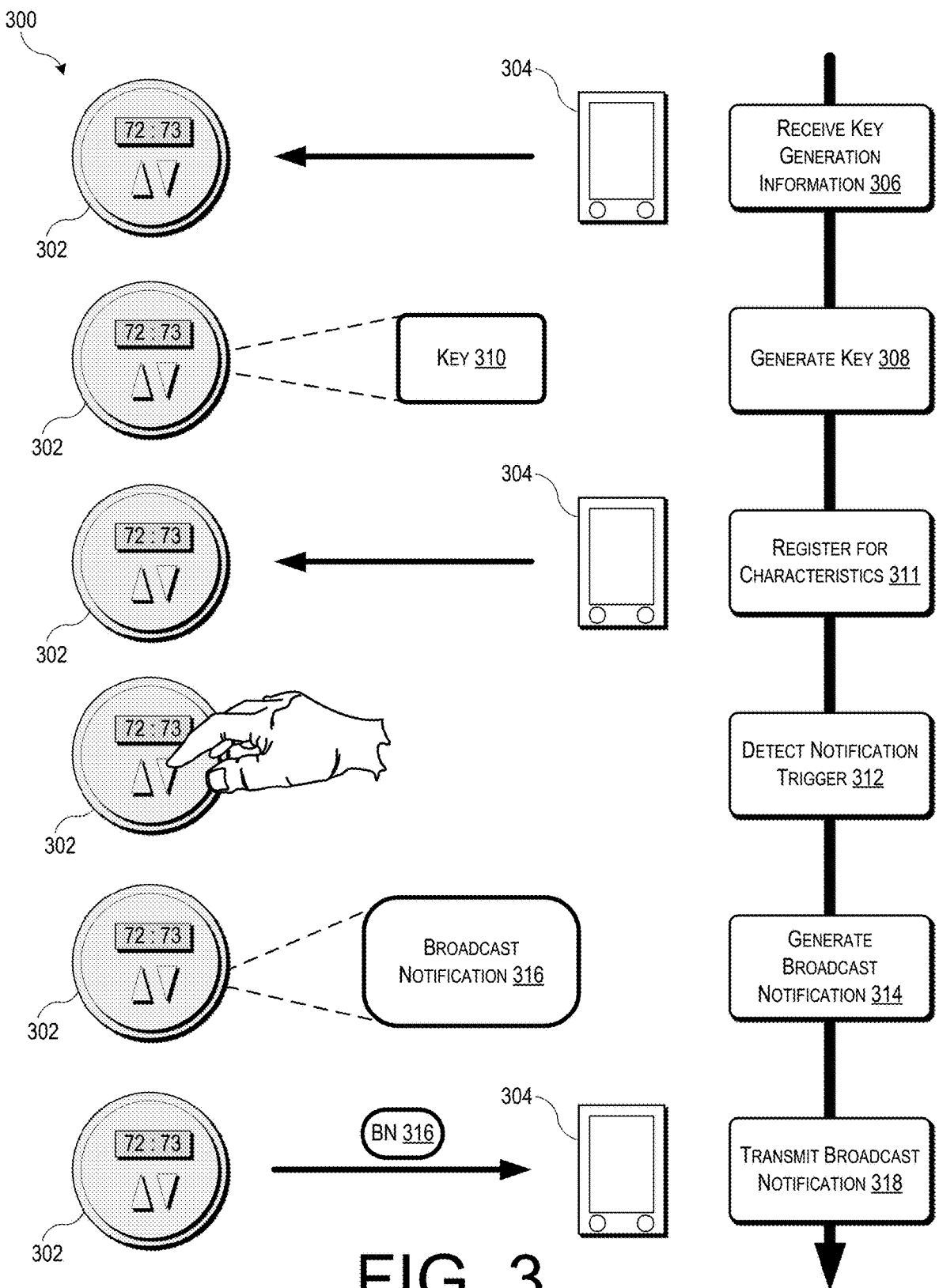
FIG. 3 is a flow diagram of a process for implementing an accessory communication control protocol according to an embodiment of the present disclosure.

FIG. 3 is a flow diagram of process 300 for implementing the accessory communication control protocol described herein. In process 300, an accessory 302 can communicate with controller 304 over one or more network connections. Accessory 302 can be, e.g., any of the accessories (e.g., 104-112) in FIG. 1, and controller 304 can be, e.g., controller 102 of FIG. 1. Controller 304 and accessory 302 may be physically located in the same home or building.

At block 306, accessory 302 can receive key generation information. As noted, the key generation information may identify a hashing algorithm (e.g., HKDF-SHA-512 or other scheme) for generating the shared key that will be used to encrypt and/or decrypt the payload of the broadcast notification. The key generation information can be received when the device (e.g., accessory 302) is added to the system, when a user decides to configure an automation, or when accessory 302 is updated with new firmware that enables use of the broadcast notification protocol.

At block 308, accessory 302 can utilize the key generation information to generate key 310. As noted, key 310 can be used to encrypt the payload that includes the state counter, the status update information (e.g., instance identifier/value pairs), and key 310. A key may also be generated by controller 304 using the same key generation information.

At block 311, controller 304 can transmit information that identifies one or more characteristics of interest (e.g., registering or subscribing for characteristics). In some cases, this step is performed after key 310 is generated at block 308 so that characteristics can be dynamically updated. In other words, a user may request to be notified immediately about certain characteristics at one time, and then later change their mind and de-register for those characteristics. This information can also be received when the device (e.g., accessory 302) is added to the system, when a user decides to configure an automation, or when accessory 302 is updated with new firmware that enables use of the broadcast notification protocol. The information received identifies which characteristics or types of characteristics of accessory 302 are to be included in the broadcast notification. This identification may be in the form of one or more instance identifiers. Further, the information received at block 308 may also include timing information that indicates how often accessory 302 is to provide the broadcast notifications to controller 304. For example, controller 304 may configure accessory 302 to only provide status updates at certain times, after a particular amount of time has passed, and/or based at least in part on other timing factors.

At block 312, accessory 302 may detect that a notification is to be provided to controller 304. The notification could indicate a status change; however, in some cases the notification may include remaining battery life information or an indication that accessory 302 is still active. While FIG. 3 illustrates a user selecting a button or UI element of accessory 302, any status change or information notification can be detected at this stage. For example, if an external sensor of accessory 302 identifies a temperature increase or decrease, the change in temperate would trigger the notification. Alternatively, for other devices, different notifications may be triggered. For example, a door sensor may identify when a door has been opened or is in an open position for a certain amount of time. Further, the notification may be triggered by accessory 302 determining that it's time to indicate that is still active. Once the notification is triggered at block 312, accessory 302 may determine whether to broadcast the notification. As noted, in some examples, accessory 302 may not broadcast the notification (e.g., if the notification is of a change that corresponds to a characteristic or type for which controller 304 is not registered).

At block 314, accessory 302 may generate the broadcast notification 316. The broadcast notification can include the device ID and the payload (e.g., the list of instance identifiers and associated values (e.g., the status updates), and the state counter). Additionally, as part of generating broadcast notification 316, accessory 302 may use the state counter and the shared key to encrypt the payload (e.g., the notification and/or the status updates).

At block 318, accessory 302 can transmit broadcast notification 316 to controller 304. Controller 304 can then decrypt the payload using the shared key and the state counter, unpack the payload by extracting the instance IDs and values, and store the values in a table that corresponds to the device ID. Controller 304 can also perform one or more operations and/or transmit one or more instructions to other devices based at least in part on the data that is unpacked from the payload. For example, if a door is opened, controller 304 may be configured to turn on a set of lights. Controller 304 may be configured by a user with instructions that, when executed, instruct controller 304 to carry out the operations.

In some instances, controller 304 may be a mobile user device (e.g., a mobile phone) that can receive broadcast notification 316 over a Bluetooth (or the like) connection or, alternatively, via an WiFi router or other access point. However, in other instances, controller 304 may be a home hub (e.g., smart TV device or other base station device), such as controller 103 of FIG. 1. If controller 304 is acting as a home hub, and a different controller in the home receives broadcast notification 316, the other controller may be able to decrypt broadcast notification 316 (e.g., the home hub may have provided the keys and counters to all controllers in the home), and may then relay broadcast notification 316 to the home hub and/or other controllers with which it can communicate. In this way, when broadcast notification 316 is sent, every controller within the home (or every controller that is associated with an account of the user that configured the accessory) will eventually receive broadcast notification 316. However, in some examples, one or more controllers may miss broadcast notification 316 entirely. If the device that missed the notification is the home hub, one or more other controllers that did receive the notification can be configured to provide broadcast notification 316 to the home hub. The home hub can then act on the status update or heartbeat (e.g., by performing an automation, notifying a user, logging that the accessory is still available, etc.). For example, the home hub can act as the central engine for determining which controllers are interested in the information contained in broadcast notification 316 (e.g., if broadcast notification 316 identifies an event), which automations are to be run based on the information, what other accessories are to be controlled based on the information, etc.

Figure 4:
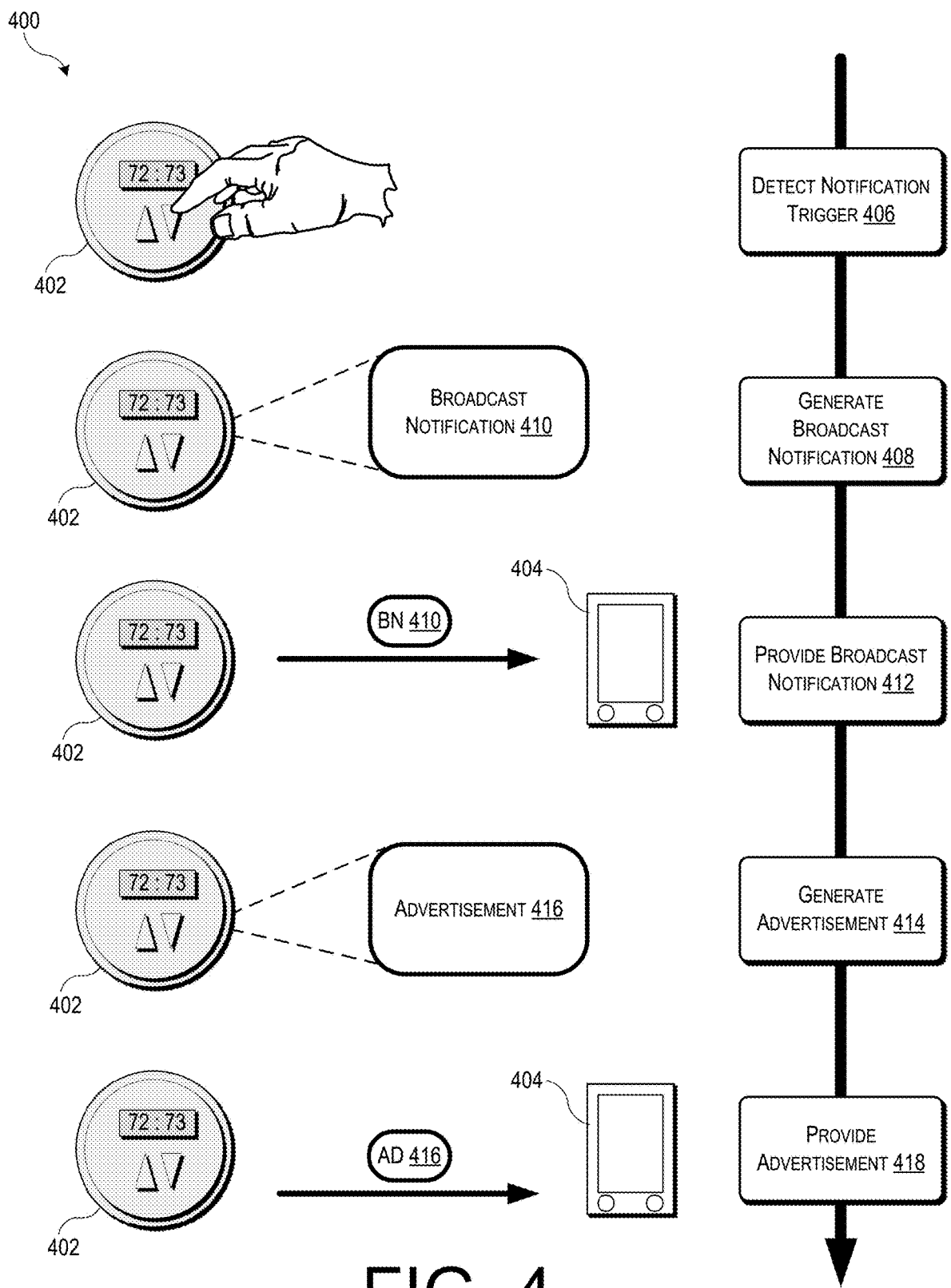
FIG. 4 is another flow diagram of a process for implementing the accessory communication control protocol according to an embodiment of the present disclosure.

FIG. 4 is another flow diagram, this time illustrating process 400 for implementing the accessory communication control protocol described herein. In process 400, an accessory 402 may be in communication with a controller 404 (e.g., the devices may be proximate to one another and communicating via Bluetooth or other close-range communication protocol), and can communicate with controller 404 over one or more network connections. Accessory 402 can be, e.g., any of the accessories (e.g., 104-112) in FIG. 1, and controller 404 can be, e.g., controller 102 of FIG. 1. Process 400 is similar to process 300, except that in process 400, controller 404 may not be configured and/or updated with the accessory communication control protocol. As such, controller 404 may be expecting or otherwise listening for an advertisement, upon which it will respond to accessory 402 with handshake information or with secure session information. As such, if controller 404 is not updated with the accessory communication control protocol (e.g., controller 404 is still running an older operating system), controller 404 may not know what to do when it receives a broadcast notification (e.g., broadcast notification 316 of FIG. 3). In this case, controller 404 could ignore the broadcast notification and continue to wait for an advertisement as would be expected under the prior-used method. Since accessory 402 will proceed with the prior-used method after sending the broadcast notification, if controller 404 has not been updated, it can follow the prior-used method after ignoring the broadcast notification. Alternatively, if controller 404 has been updated with the protocol, information received at the end of process 400 may be redundant and ignored. In other words, if controller 404 has been updated, and thus is able to and does unpack and utilize the information in the broadcast notification, controller 404 would then know to ignore the subsequently received advertisement. The updated controller may be configured to expect to see the advertisement after receipt of the broadcast notification. Thus, it could ignore the advertisement more proactively (as opposed to receiving data that it can not understand).

At block 406, accessory 402 may detect a status notification (e.g., a trigger is detected) to be presented. This is similar to how accessory 302 may detect a status notification at block 312 of FIG. 3. Similarly, FIG. 4 illustrates a user selecting a button or UI element of accessory 402, any status notification can be detected at this point. For example, if an external sensor of accessory 402 identifies a temperature increase or decrease, the change in temperate would be the detected status notification. Alternatively, for other devices, different status notifications may be detected. For example, a door sensor may identify when a door has been opened or is in an open position for a certain amount of time. Once the status notification is detected at block 406, accessory 402 may determine whether to broadcast the status notification. As noted, in some examples, accessory 402 may not broadcast the status (e.g., if the status corresponds to a characteristic or type for which controller 304 is not registered).

At block 408, accessory 402 may generate the broadcast notification 410. The broadcast notification can include the device ID and the payload (e.g., the list of instance identifiers and associated values (e.g., the status updates), and the state counter). Additionally, as part of generating broadcast notification 410, accessory 402 may use the state counter and the shared key to encrypt the payload (e.g., the status notification).

At block 412, accessory 402 can transmit broadcast notification 410 to controller 404. If controller 404 has been configured with the new protocol, it can decrypt the payload using the shared key and the state counter, unpack the payload by extracting the instance IDs and values, and store the values in a table that corresponds to the device ID. Controller 304 can also perform one or more operations and/or transmit one or more instructions to other devices based at least in part on the data that is unpacked from the payload. For example, if a switch was activated and the payload indicates that the update is the switch going from "off" to "on," controller 404 may be configured to turn on one or more lights. Controller 404 may be configured by a user with instructions that, when executed, instruct controller 404 to carry out the operations. Alternatively, if controller 404 is not configured with the new protocol, controller 404 may not be equipped to process broadcast notification 410. In other words, controller 404 may not know what to do with broadcast notification 410 and, as such, controller 404 might ignore it. In some examples, controller 404 may be out of range of accessory 402 when broadcast notification 410 is transmitted. However, another accessory may be in range, and may receive broadcast notification 410. In this case, the other accessory may identify broadcast notification 410 as being intended for controller 404 (or some other device) and may re-broadcast broadcast notification 410 to controller 404 (or some other device). In this way, any accessory or set of accessories may act as a relay or set of relays to eventually get broadcast notification 410 to its intended recipient (e.g., controller 404 in this case).

At block 414, accessory 402 can generate an advertisement 416. Advertisement 416 is configured to indicate that accessory 402 has a status update; however, advertisement 416 does not include the payload. Instead, advertisement 416 is merely a notification to let controller 404 know that a status update is ready to be transmitted.

At block 418, accessory 402 can transmit advertisement 416 to controller 404. In some cases, advertisement 416 may be generated and/or transmitted regardless of whether the status update includes information about a characteristic for which controller 404 is registered. Additionally, advertisement 416 may be generated and transmitted even if controller 404 was appropriately configured with the new protocol. In this case, controller 404 will understand that advertisement 416 is redundant, and controller 404 can ignore advertisement 416. However, when controller 404 has not been updated with the new protocol, generation and transmission of advertisement 416 enables backwards compatibility with older, outdated, or otherwise not-updated controller devices.

Figure 5:
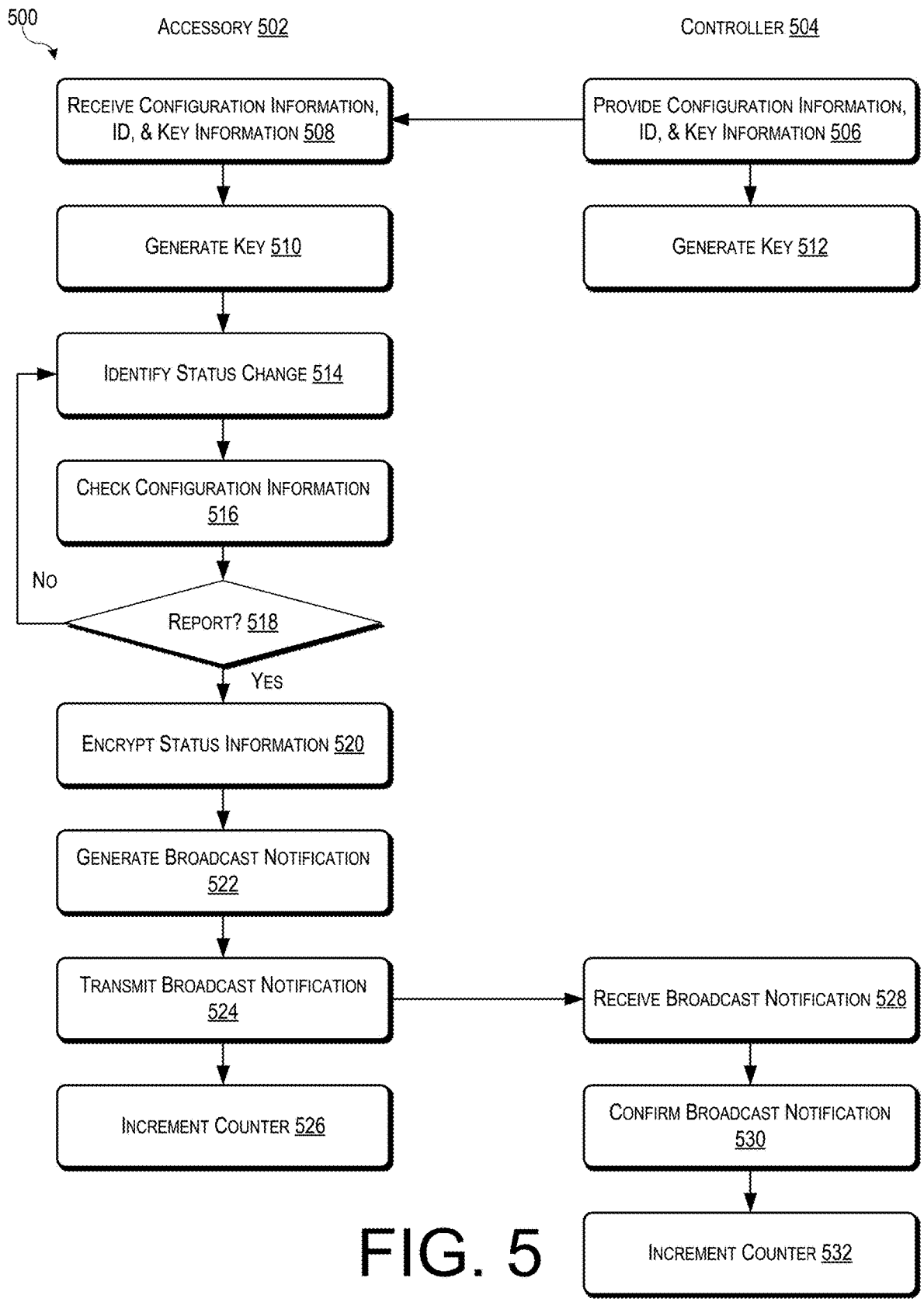
FIG. 5 is another flow diagram of a process for implementing the accessory communication control protocol according to an embodiment of the present disclosure.

FIG. 5 is another flow diagram, this time illustrating process 500 for implementing the accessory communication control protocol described herein. In process 500, an accessory 502 is in communication with a controller 504, and can communicate with controller 504 over one or more network connections. Accessory 502 can be, e.g., any of the accessories (e.g., 104-112) in FIG. 1, and controller 504 can be, e.g., controller 102 of FIG. 1. Process 500 is similar to process 300 and 400. In this example, controller 404 has been updated with the protocol, and therefore is configured to execute instructions to work along with accessory 502 to implement the protocol (e.g., including decrypting the broadcast notification, etc.).

At block 506, controller 504 may provide (e.g., transmit) configuration information, a device ID, and key generation information to accessory 502. The configuration information may include information identifying for which characteristics of accessory 502 controller 504 is to be registered. Additionally, the configuration information can include timing rules for how often controller 504 is to be notified for particular characteristics. For example, controller 504 may request to be registered for a first characteristic with a frequency of "every change" and/or a second characteristic with a frequency of "once per day" or "once per x," where "x" is some time period. As noted, the device ID can be generated randomly by controller 504 or some other device (e.g., a network hub or identity management server) and can be unique for each accessory with which controller 504 is in communication. The key information can include key generation information (e.g., identifying what encryption algorithm to use, a private key to pair with a known public key, etc.). In some examples, the key information may also include instructions for when to generate the key (e.g., after a certain number of uses (e.g., 355 or the like), after a certain amount of time (e.g., 8 days or the like), after a malicious connection attempt is detected, once the state number needs to be rolled over, etc.).

At block 508, accessory 502 may receive the configuration information, the device ID, and the key information from controller 504. Accessory 502 can utilize this information to determine when and/or how often to generate a key. Accessory 502 may also utilize this information to determine when to regenerate the key (e.g., to generate a new one to be used in place of an old one).

At block 510, accessory 502 can generate or regenerate a new key. As noted, the key may be generated using the key information and the generation may be based at least in part on one or more hashing algorithms that take advantage of a public/private pair encryption mechanism.

At block 512, controller 504 can generate or regenerate a new key as well. The key generated by controller 504 will be the same as the key generated by accessory 502 at block 510 because they will be using the same security protocols. In other words, the security protocol of accessory 502 and the security protocol of controller 504 will match.

At block 514, accessory 502 may identify a state change of one or more of the characteristics of accessory 502. For example, accessory 502 may detect that a user has selected a button or switch, that the temperature has increased or decreased past some threshold, that a door or window has been opened, that motion has been detected, etc.

At block 516, accessory 502 may check the configuration information received from controller 504. By checking the configuration information, accessory 502 may be able to determine whether the status change that was detected (e.g., identified) at block 514 matches one of the characteristics for which controller 504 has registered. Based on this determination, accessory 502 will determine whether to report the detected change.

At block 518, accessory 502 will determine whether to report the status update. The determination may be based at least in part on whether controller 504 is registered for that characteristic, type of characteristic, or particular change. Additionally, the determination may be based at least in part on a schedule or an amount of time that has passed since the last status update. If accessory 502 determines not to report the status update, accessory device 502 can return to block 514 to continue waiting for the next status change. Otherwise, accessory 502 can proceed to block 520.

At block 520, accessory 502, having determined to report the status change at block 518, can encrypt the status information (along with the rest of the payload) into an encrypted payload. As described, the encryption process can include using a hashing algorithm with the key that was generated at block 510 and the global state counter (e.g., a nonce). Additionally, the status update or updates, the nonce, and the key (e.g., the public key of a public/private key pair) are all encrypted together as the payload.

At block 522, accessory 502 can generate the broadcast notification. The broadcast notification will include the status information (and nonce) that was encrypted at block 520. Additionally, the broadcast notification will include the key that was generated at block 510 and the device ID that was received from controller 504.

At block 524, accessory 502 can transmit the broadcast notification to controller 504. In some examples, the broadcast notification may be a single time via a Bluetooth connection or via a WiFi connection. However, in other examples, no persistent connection exists and the broadcast notification will need to transmitted repeatedly over a period of time. For example, accessory 502 may beacon (e.g., repeatedly transmit to any and all devices in range) the broadcast notification for some time, e.g., for 30 milliseconds (ms) or the like.

At block 526, accessory 502 will increment the counter after transmitting the broadcast notification. This enables detection of replay attacks and ensures that controller 504 is able to confirm that the broadcast notification it just received was the most recent broadcast notification.

At block 528, controller 504 receives the broadcast notification that was transmitted by accessory 502 at block 524. In some examples, controller 504 is configured to listen or scan for messages from any accessory devices or other controller devices. The scanning may occur in intervals for a specific amount of time. For example, controller 504 may scan for messages every 300 ms for 30 ms each time. In other words, controller 504 may scan for messages for 30 consecutive ms, and then wait 300 ms before scanning for 30 ms again. This may be repeated at these or other time intervals until a broadcast notification is received or regardless of whether any messages are received.

At block 530, controller 504 can confirm that the broadcast notification is the appropriate next broadcast notification. This may be confirmed by a) checking the device ID and b) attempting to decrypt the encrypted payload using the state counter and the key. Controller 504 will know that the key is accurate because its key and the key of accessory 502 were generated using matching algorithms and because the key is included in the broadcast notification. Thus, if the payload does not decrypt correctly, then the state counter maintained at controller 504 and the state counter maintained at accessory 502 (e.g., the state counter used to encrypt the payload) do not match. This can mean that controller 504 missed some of the broadcast notifications transmitted by accessory 502 or that a replay attack is being attempted. Additionally, in some examples, authentication of the broadcast notification can be performed by generating an authentication tag and comparing it to the authentication tag that is part of the encrypted payload. If the broadcast notification is confirmed by controller 504, an acknowledgment (e.g., a dummy connection request) can be send back to accessory 502. Additionally, controller 504 can perform any operations it is configured to perform based at least in part on the status update that is extracted from the broadcast notification (e.g., once it is decrypted and unpacked). If a replay attack is detected, controller 504 can generate a new key and instruct accessory 502 to generate a new key as well. In some cases, the replay attack can be detected by identifying that the counter value included in the broadcast notification is a counter value that corresponds to a broadcast notification that was already received by controller 504.

At block 532, controller 504 can increment the counter to keep up with the counter that was incremented by accessory 502 at block 526. As noted, in some instances, the counter value will roll back to zero after some time. For example, if the key is 42 bits, there will 356 different possible keys; and, since the key and counter combination is not to be repeated, the counter may roll back to zero after 355. Other scenarios may be used, as appropriate, to roll the counter back to zero while avoiding having the same counter/key pair be repeated.

While FIGS. 3-5 illustrated flows for an accessory to provide broadcast notifications to a controller (e.g., a mobile device or a network-connected hub), it should be understood that the accessory communication control protocol could also be used in the opposite direction. In other words, a controller could use the protocol to send update instructions (e.g., in a broadcast notification) to one or more accessories (e.g., in a group or scene). One example of such functionality includes a controller instructing a set of lights to turn on at the same time. In this example, the light accessories would be required to be listening at all times so it would work best with light accessories that are plugged into a power source (or have very strong or long-lasting batteries). If the light accessories are listening at all times, the controller could send a broadcast notification along the lines of that described above to each of the lights in a group, and the payload could include an instruction instead of a status update. The instruction could instruct the accessory regarding which characteristic of the accessory is to be changed. Scenes could be configured with multiple different accessories and/or types of accessories so that a single broadcast notification could enable several different accessories to be instructed regarding characteristic changes. For example, when a front door is opened, the controller could implement a scene using the protocol described above to a) turn the heater on, b) turn the lights on, and c) play music on an audio player. The broadcast notification could include instructions for a), b), and c) in a single encrypted payload.

Example Devices

Embodiments described herein can be implemented in electronic devices that can be of generally conventional design and adapted to conform to an accessory communication control protocol to support broadcast notification (e.g., secure broadcast sessions) by which an accessory (a first electronic device) can provide status updates to a controller (a second device) and/or command-and-control operations by which a controller (a first electronic device) can control operation of an accessory (a second electronic device).

Figure 6:
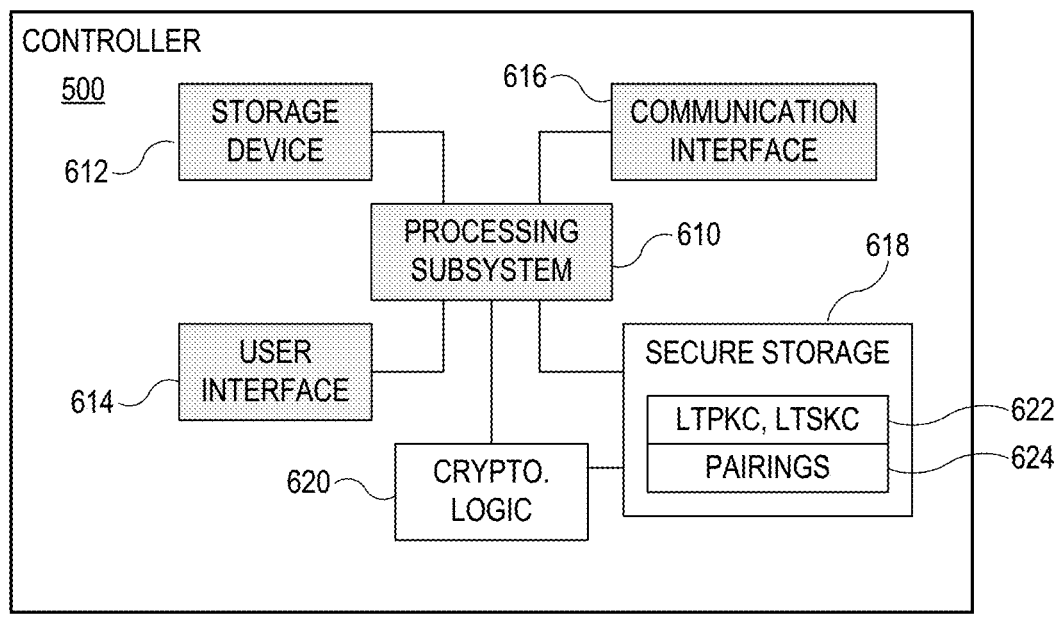
FIG. 6 is a simplified block diagram of a controller according to an embodiment of the present disclosure.

FIG. 6 is a simplified block diagram of a controller 600 according to an embodiment of the present disclosure. Controller 600 can implement any or all of the controller functions, behaviors, and capabilities described herein, as well as other functions, behaviors, and capabilities not expressly described. Controller 600 can include processing subsystem 610, storage device 612, user interface 614, communication interface 616, secure element 618, and cryptographic logic module 620. Controller 600 can also include other components (not explicitly shown) such as a battery, power controllers, and other components operable to provide various enhanced capabilities. In various embodiments, controller 600 can be implemented in a desktop computer, laptop computer, tablet computer, smart phone, wearable computing device, or other systems having any desired form factor. Further, as noted above, controller 600 can be implemented partly in a base station and partly in a mobile unit that communicates with the base station and provides a user interface.

Storage device 612 can be implemented, e.g., using disk, flash memory, or any other non-transitory storage medium, or a combination of media, and can include volatile and/or non-volatile media. In some embodiments, storage device 612 can store one or more application and/or operating system programs to be executed by processing subsystem 610, including programs to implement any or all operations described herein as being performed by a controller. For example, storage device 612 can store a uniform controller application that can read an accessory definition record and generate a graphical user interface for controlling the accessory based on information therein. In some embodiments, portions (or all) of the controller functionality described herein can be implemented in operating system programs rather than applications. In some embodiments, storage device 612 can also store applications designed for specific accessories or specific categories of accessories (e.g., an IP camera application to manage an IP camera accessory or a security application to interact with door lock accessories).

User interface 614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 614 to invoke the functionality of controller 600 and can view and/or hear output from controller 600 via output devices of user interface 614.

Processing subsystem 610 can be implemented as one or more integrated circuits, e.g., one or more single-core or multi-core microprocessors or microcontrollers, examples of which are known in the art. In operation, processing system 610 can control the operation of controller 600. In various embodiments, processing subsystem 610 can execute a variety of programs in response to program code and can maintain multiple concurrently executing programs or processes. At any given time, some or all of the program code to be executed can be resident in processing subsystem 610 and/or in storage media such as storage device 612.

Through suitable programming, processing subsystem 610 can provide various functionality for controller 600. For example, in some embodiments, processing subsystem 610 can implement various processes (or portions thereof) described above as being implemented by a controller. Processing subsystem 610 can also execute other programs to control other functions of controller 600, including programs that may be stored in storage device 612. In some embodiments, these programs may interact with an accessory, e.g., by generating messages to be sent to the accessory and/or receiving messages from the accessory. Such messages can conform to an accessory communication control protocol as described above.

Communication interface 616 can provide voice and/or data communication capability for controller 600. In some embodiments communication interface 616 can include radio frequency (RF) transceiver components for accessing wireless voice and/or data networks (e.g., using cellular telephone technology, data network technology such as 4G, 5G/LTE, Wi-Fi (IEEE 902.11 family standards), or other mobile communication technologies, or any combination thereof), components for short-range wireless communication (e.g., using Bluetooth and/or Bluetooth LE standards, NFC, etc.), and/or other components. In some embodiments communication interface 616 can provide wired network connectivity (e.g., Ethernet) in addition to or instead of a wireless interface. Communication interface 616 can be implemented using a combination of hardware (e.g., driver circuits, antennas, modulators/demodulators, encoders/decoders, and other analog and/or digital signal processing circuits) and software components. In some embodiments, communication interface 616 can support multiple communication channels concurrently, using the same transport or different transports.

Secure storage module 618 can be an integrated circuit or the like that can securely store cryptographic information for controller 600. Examples of information that can be stored within secure storage module 618 include the controller's long-term public and secret keys 622 (LTPKC, LTSKC as described above), and a list of accessories (e.g., a lookup table that maps accessory ID to accessory long-term public key LTPKA for accessories that have completed a pair setup or pair add process as described above). The lookup table can also be configured to map MAC addresses with randomly generated device IDs. The device IDs can be rolled (e.g., changed to new device IDs) at random intervals to avoid third parties from detecting a device ID or detecting a home based on a list of detected IDs. The lookup table can also be configured to map each accessory with a counter, a securely generated key, as well a list of instance IDs that identify which characteristics of the accessory the controller is interested in tracking (e.g., listing which characteristics the controller is to be updated).

In some embodiments, cryptographic operations can be implemented in a cryptographic logic module 620 that communicates with secure storage module 618. Physically, cryptographic logic module 620 can be implemented in the same integrated circuit with secure storage module 618 or a different integrated circuit (e.g., a processor in processing subsystem 610) as desired. Cryptographic logic module 620 can include various logic circuits (fixed or programmable as desired) that implement or support cryptographic operations of controller 600, including any or all cryptographic operations described above. Secure storage module 618 and/or cryptographic logic module 620 can appear as a "black box" to the rest of controller 600. Thus, for instance, communication interface 616 can receive a message in encrypted form that it cannot decrypt and can simply deliver the message to processing subsystem 610. Processing subsystem 610 may also be unable to decrypt the message, but it can recognize the message as encrypted and deliver it to cryptographic logic module 620. Cryptographic logic module 620 can decrypt the message (e.g., using information extracted from secure storage module 618) and determine what information to return to processing subsystem 610. As a result, certain information can be available only within secure storage module 618 and cryptographic logic module 620. If secure storage module 618 and cryptographic logic module 620 are implemented on a single integrated circuit that executes code only from an internal secure repository, this can make extraction of the information extremely difficult, which can provide a high degree of security. Other implementations are also possible.

Figure 7:
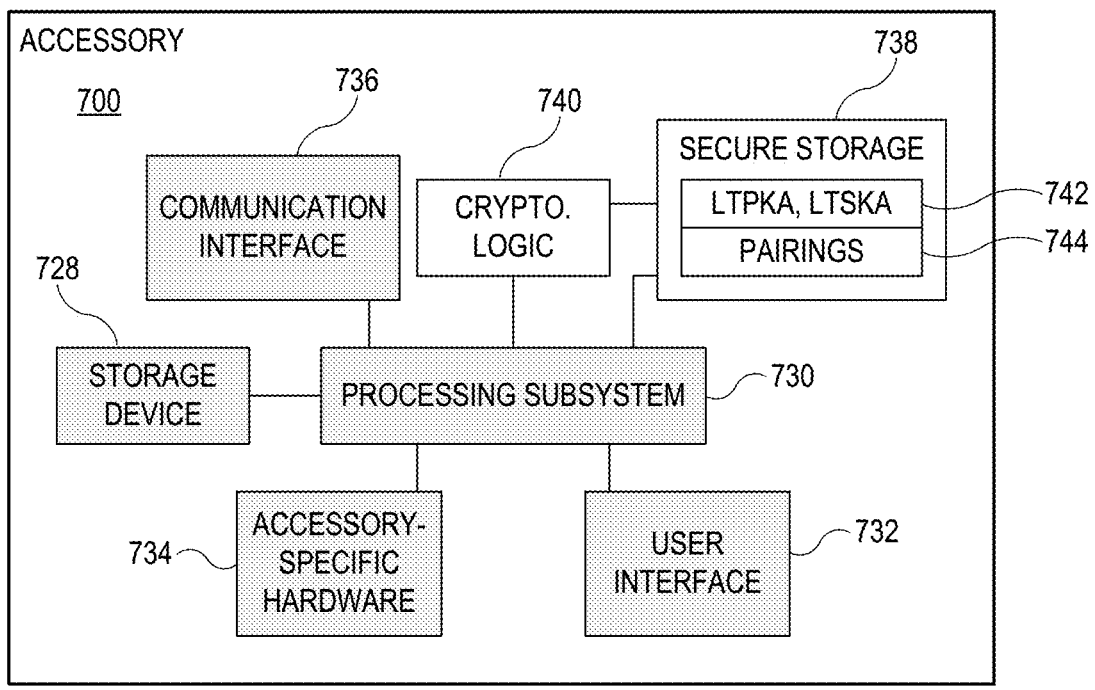
FIG. 7 is a simplified block diagram of an accessory according to an embodiment of the present disclosure.

FIG. 7 is a simplified block diagram of an accessory 700 according to an embodiment of the present disclosure. Accessory 700 can implement any or all of the accessory functions, behaviors, and capabilities described herein, as well as other functions, behaviors, and capabilities not expressly described. Accessory 700 can include storage device 728, processing subsystem 730, user interface 732, accessory-specific hardware 734, communication interface 736, secure element 738, and cryptographic logic module 740. Accessory 700 can also include other components (not explicitly shown) such as a battery, power controllers, and other components operable to provide various enhanced capabilities.

Accessory 700 is representative of a broad class of accessories that can be operated by a controller such as controller 600 of FIG. 6, and such accessories can vary widely in capability, complexity, and form factor. Various accessories may include components not explicitly shown in FIG. 7, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); switches or buttons for receiving input (e.g., to activate or otherwise provide instructions to other accessories), sensors for detecting conditions (e.g., temperature sensors of a thermostat, contact sensors of a door or window, or the like), and so on.

Storage device 728 can be implemented, e.g., using disk, flash memory, or any other non-transitory storage medium, or a combination of media, and can include volatile and/or non-volatile media. In some embodiments, storage device 728 can store one or more programs to be executed by processing subsystem 730, including programs to implement various operations described above as being performed by an accessory, as well as operations related to particular accessory behaviors. Storage device 728 can also store an accessory object or accessory definition record (e.g., as described above) that can be furnished to controller devices, e.g., as described above. Storage device 728 can also store accessory state information and any other data that may be used during operation of accessory 700.

Processing subsystem 730 can include, e.g., one or more single-core or multi-core microprocessors and/or microcontrollers executing program code to perform various functions associated with accessory 700. For example, processing subsystem 730 can implement any or all operations described herein as being implemented by an accessory, e.g., by executing program code stored in storage device 728. Processing subsystem 730 can also execute other programs to control other functions of accessory 730. In some instances programs executed by processing subsystem 730 can interact with a controller (e.g., controller 600), e.g., by generating messages (e.g., broadcast notifications) to be sent to the controller and/or receiving messages from the controller. Such messages can conform to the accessory communication control protocol described above.

User interface 732 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 700, a user can operate input devices of user interface 732 to invoke functionality of accessory 700 and can view and/or hear output from accessory 700 via output devices of user interface 734. Some accessories may provide a minimal or no user interface.

Accessory-specific hardware 734 can include any other components that may be present in accessory 700 to enable or support its functionality. For example, in various embodiments accessory-specific hardware 734 can include one or more storage devices using fixed or removable storage media; GPS receiver; power supply and/or power management circuitry; a camera; a microphone; one or more actuators; environmental sensors (e.g., temperature sensor, pressure sensor, accelerometer, chemical sensor, etc.); and so on. It is to be understood that any type of accessory functionality can be supported by providing appropriate accessory-specific hardware 734.

Communication interface 736 can provide voice and/or data communication capability for accessory 700. In some embodiments communication interface 736 can include radio frequency (RF) transceiver components for accessing wireless voice and/or data networks (e.g., using cellular telephone technology, data network technology such as 4G, 5G/LTE, Wi-Fi (IEEE 902.11 family standards), or other mobile communication technologies, or any combination thereof), components for short-range wireless communication (e.g., using Bluetooth and/or Bluetooth LE standards, NFC, etc.), and/or other components. In some embodiments communication interface 736 can provide wired network connectivity (e.g., Ethernet) in addition to or instead of a wireless interface. Communication interface 736 can be implemented using a combination of hardware (e.g., driver circuits, antennas, modulators/demodulators, encoders/decoders, and other analog and/or digital signal processing circuits) and software components. In some embodiments, communication interface 736 can support multiple communication channels concurrently, using the same transport or different transports.

Secure storage module 738 can be an integrated circuit or the like that can securely store cryptographic information for accessory 700. Examples of information that can be stored within secure storage module 738 include the accessory's long-term public and secret keys 742 (LTPKA, LTSKA as described above), and a list of registered controllers 744 (e.g., a lookup table that maps controller ID to controller long-term public key LTPKC for controllers that have completed a pair setup or pair add process as described above).

In some embodiments, cryptographic operations can be implemented in a cryptographic logic module 740 that communicates with secure storage module 738. Physically, cryptographic logic module 740 can be implemented in the same integrated circuit with secure storage module 738 or a different integrated circuit (e.g., a processor in processing subsystem 730) as desired. Cryptographic logic module 740 can include various logic circuits (fixed or programmable as desired) that implement or support cryptographic operations of accessory 700, including any or all cryptographic operations described above. Secure storage module 738 and/or cryptographic logic module 740 can appear as a "black box" to the rest of accessory 700. Thus, for instance, communication interface 736 can receive a message in encrypted form that it cannot decrypt and can simply deliver the message to processing subsystem 730. Processing subsystem 730 may also be unable to decrypt the message, but it can recognize the message as encrypted and deliver it to cryptographic logic module 740. Cryptographic logic module 740 can decrypt the message (e.g., using information extracted from secure storage module 738) and determine what information to return to processing subsystem 730. As a result, certain information can be available only within secure storage module 738 and cryptographic logic module 740. If secure storage module 738 and cryptographic logic module 740 are implemented on a single integrated circuit that executes code only from an internal secure repository, this can make extraction of the information extremely difficult, which can provide a high degree of security. Other implementations are also possible.

Accessory 700 can be any electronic apparatus that interacts with a controller such as controller 600 of FIG. 6. In some embodiments, controller 600 can provide remote control over operations of accessory 700 as described above. For example controller 600 can provide a remote user interface for accessory 700 that can include both input and output controls (e.g., a display screen to display current status information obtained from accessory 700 and an input control such as a touchscreen overlay to allow changes to the status information). Controller 600 in various embodiments can control any function of accessory 700 and can also receive data from accessory 700.

Figure 8:
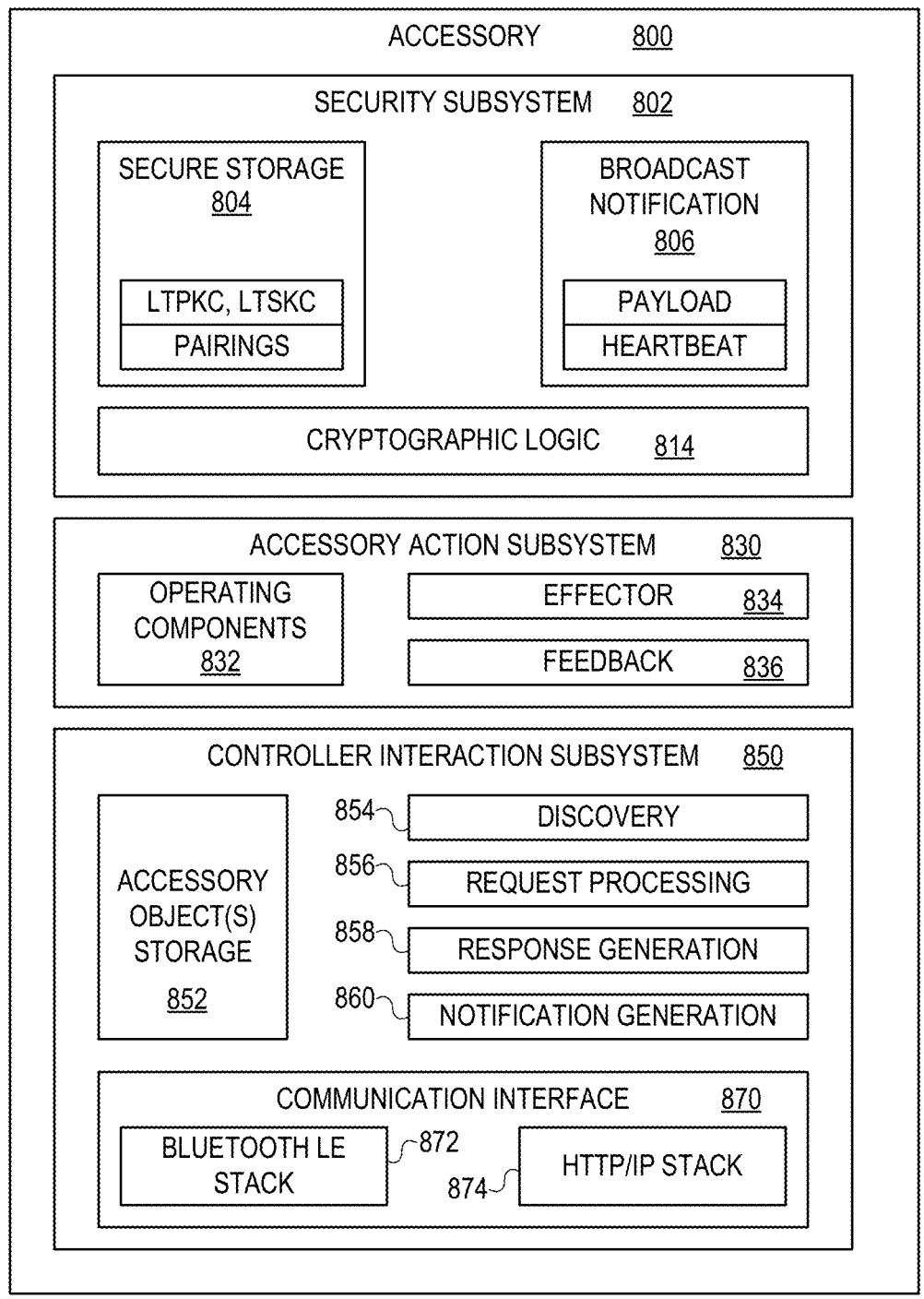
FIG. 8 is a simplified block diagram of an accessory architecture according to an embodiment of the present disclosure.

FIG. 8 shows an example of an accessory architecture for an accessory 800 according to an embodiment of the present disclosure. The accessory architecture is shown as a set of interacting subsystems, where each subsystem includes one or more modules. It is to be understood that each of the modules can be implemented using program code executing on one or more programmable processors and/or in one or more fixed-function processors and that the processor(s) can include output signaling to control other hardware devices (e.g., actuators, displays, etc.) and/or input signaling to receive signals from other hardware devices (e.g., keyboards; touchscreens; feedback or status signals from actuators, motors, or sensors; etc.). Some of the subsystems can include persistent data storage, which can be implemented using any type of nonvolatile storage device (e.g., semiconductor flash memory, EEPROM, magnetic or optical disk, etc.). Although not shown, some or all of the subsystems can include additional hardware elements, such as displays, keyboards, touchscreens, microphones, speakers, motors, actuators, sensors, etc.

Security subsystem 802 can include secure storage element 804, broadcast notification module 806, and cryptographic logic module 814. Secure storage element 804 can be similar or identical to secure storage element 738 of FIG. 7 or other secure storage elements described above. In some embodiments, secure storage element 804 is used to securely store a long-term public/secret key pair for accessory 800 (e.g., LTPKA, LTSKA as described above) as well as pairing records for each controller with which accessory 800 has an established pairing. In embodiments where accessory 800 uses different long-term public keys in connection with different controllers, each pairing record can also include an indicator of the long-term public key to be used with the paired controller. Other information can be included if desired.

Broadcast notification module 806 can implement accessory portions of the accessory communication control protocol described herein. In some examples, broadcast notification module 806 can generate, in conjunction with cryptographic logic 814, a broadcast notification that can be sent to a controller to effectuate a secure broadcast session. In some examples, broadcast notification module 806 is configured provide the payload to cryptographic logic module 814, and then package the encrypted payload into the broadcast notification prior to transmitting it to the controller. Additionally, in some examples, broadcast notification module 806 is configured to generate a heartbeat.

Heartbeats are useful from a security/privacy perspective in that they enable random generation of data that can be transmitted to controllers at random times. In some cases, malicious third-parties may attempt to detect what devices are in a home. As such, having a picture of what messages are being sent between devices in a home, even if the third-party cannot access the data in the messages, is a security risk. Malicious third-parties could use the messages themselves to help inform them of what devices exist, what operations they perform, and how to spoof them. By having accessories provide random heartbeats to controllers, this can confuse the third-parties and potentially thwart the malicious attempts. Thus, one functionality of broadcast notification module 806 is to generate random heartbeat messages and send them at random times. Thus, some broadcast notifications will contain an encrypted payload, and others will contain a heartbeat (e.g., an empty payload, or a payload with data that is meaningless to the controller). In some cases, the payload of the heartbeat may include information that identifies the broadcast notification as a heartbeat as opposed to a status update. The payload of the heartbeat may also indicate that the accessory is still there (e.g., that the battery still has enough power to send broadcast notifications). The payload of the heartbeat may also be encrypted, with a particular instance ID that identifies the heartbeat (e.g., there may be an IID for the heartbeat, that when decrypted instructs the controller that the payload is for the heartbeat).

Heartbeats are also useful for low-power accessories. For example, some accessories may run solely on a coin cell batter (or other low-power batteries). These accessories have limited battery capacity, and therefore should not report broadcast notifications too often. Additionally, some of these low-power accessories were configured that way because they do not need to report changes often (e.g., they sense things that do not occur often by their very nature). For example, a switch (e.g., contact sensor) may only need to report when a user activates the switch. For certain uses, the switch may not be accessed by the user very often (e.g., once or twice day, or even less). In some cases, the low-power accessory may be configured to provide broadcast notifications with no payload (e.g., a heartbeat) on regular intervals (e.g., every two hours). This broadcast notification lets the controller know that the battery of the accessory is still operational. In this way, the controller can let the user know when the battery has died (e.g., if more than two hours goes after the last broadcast notification (whether it includes a status update or a heartbeat). However, as noted, broadcast notification module 806 may also be configured to provide random heartbeats sooner than the scheduled heartbeat (e.g., in order to add security/privacy to the system).

Cryptographic logic module 814 can implement cryptographic algorithms usable by accessory 800. Examples include: key generation algorithms; algorithms and functions used in SRP; hash algorithms such as HKDF-SHA-512; key-based encryption/decryption algorithms such as ChaCha20-Poly1305, Curve25519, Ed25519, and/or other algorithms. In some embodiments, cryptographic logic module 814 can provide an API (application program interface) that is usable by other modules of accessory 800 to invoke cryptographic algorithms and related services. Any number and combination of cryptographic algorithms and related services can be supported.

Accessory action subsystem 830 can manage various operations of hardware and/or software components of accessory 800, e.g., in response to requests received from a controller via controller interaction subsystem 850. For example, accessory 800 can incorporate (or communicate with) various operating components 832 that can take specific actions (e.g., opening or closing a door, operating a camera, etc.). Operating components 832 can include hardware and/or software components, and a given operating component 832 can respond to received control signals (e.g., electrical signals in digital or analog form) from effector module 834 and/or generate feedback signals (e.g., electrical signals in digital or analog form) to feedback module 836.

Effector module 834 can generate control signals to operating components 832, e.g., to effect or implement an operation requested by the user. The particular signals can depend on the particular operating component 832 being addressed. By way of illustration, operating components 832 can include a switching circuit that can switch power on or off, and effector module 832 can generate a signal to the switching circuit to turn on or off power. As another example, operating components 832 can include an electromechanical actuator that can produce motion of a physical object (e.g., latching or unlatching a deadbolt, opening or closing a door) in response to an electrical control signal, and effector module 832 can generate a signal to the actuator. As still another example, operating components 832 can include an API for controlling a digital camera (the camera itself might or might not be an operating component, depending on implementation), and effector module 832 can invoke API calls to control the digital camera. In various embodiments, effector module 834 can operate in response to requests from a controller received via controller interface subsystem 850 and/or inputs received at a user interface of accessory 800.

Feedback module 836 can receive feedback signals from operating components 832. The particular signals can depend on the particular operating component 832. For example, a switching circuit can provide a feedback signal indicating the current state of the switch. An electromechanical actuator can provide feedback signals indicating current status (e.g., position and/or motion of the physical object). An API can provide error or status codes (e.g., upon return from an API call). As yet another example, operating components 832 can include one or more sensors for various environmental conditions (e.g., motion sensors, position sensors, temperature sensors, obstruction sensors, etc.), and feedback module 836 can receive sensor data signals from the sensors. In some embodiments, feedback module 836 can provide feedback information based on the received feedback signals to controller interaction subsystem 850.

Controller interaction subsystem 850 can support interactions between accessory 800 and a controller. Accessory object(s) storage element 852 can be implemented using volatile or nonvolatile storage media (e.g., semiconductor flash memory, EEPROM, DRAM, SRAM, magnetic or optical disk, etc.). In some embodiments, accessory objects storage element 852 can be used to store a representation of one or more accessory objects that can be used by a controller to interact with accessory 800. The stored accessory object(s) can be served to controllers upon request (e.g., during registration or after performing a pair verify process with the controller), and the stored accessory object(s) can be updated as the state of the accessory changes. For example, feedback module 836 can update the stored accessory object(s) based on feedback signals received from operating components 832.

Discovery module 854 can perform operations related to making accessory 800 discoverable to a controller, such as broadcasting the broadcast notification and/or an advertisement, receiving a request to perform pair setup from a controller that does not have an established pairing, and so on.

Request processing module 856 can receive and process request messages from controllers. For example, in response to a received request message (e.g., to write to a lock-state characteristic as described above), request processing module 856 can determine whether the request is permitted (e.g., whether a pair-verified state exists with the controller, whether the message is encrypted using a valid session key, and whether the controller has permission to perform the requested action). Assuming the request is valid, request processing module 856 can generate instructions to effector module 834 (e.g., to actuate a lock mechanism). In some embodiments, determining whether the request is permitted can include decrypting the message, and request processing module 856 can invoke functions supported by cryptographic logic module 814 in connection with processing the request. In some embodiments, request processing module 856 can interact with security subsystem 802 to receive and process requests received from a controller during a pair setup, pair verify, pair add, or pair remove operation.

Response generation module 858 can generate and send responses to request messages and send response messages to controllers. For example, if request processing module 856 receives a request and determines that it is not permitted, request processing module 856 can so inform response generation module 9758, and response generation module 858 can generate an error response. On the other hand, if request processing module 856 receives a request and determines that it is permitted, request processing module 856 can inform response generation module 858 that a permitted request was received and is being processed by effector module 834. In some embodiments, response module 858 can wait to receive feedback information from feedback module 836, then generate a response message that incorporates the feedback information. For example, if response generation module 858 receives a request to read a sensor or open a lock, response generation module 858 can wait to receive the sensor reading or a confirmation of the lock opening from feedback module 836, then generate an appropriate response message. In some embodiments, the response message can be encrypted prior to sending, and response generation module 858 can invoke functions supported by cryptographic logic module 814 in connection with encrypting the message. In some embodiments, response generation module 858 can interact with security subsystem 802 to generate and send responses to a controller during a pair setup, pair verify, pair add, or pair remove operation.

Notification generation module 860 can receive information from feedback module 836 (e.g., whenever an accessory object stored in accessory object(s) storage element 852 is updated) and can generate notification messages to controllers based on the information. As described above, various notification mechanisms can be supported, and notification generation module 860 can support any or all of these notification mechanisms. For example, in the case of a passive notification, notification processing module 860 can simply update an internal state counter maintained in accessory object(s) storage element 852. In the case of a broadcast notification and/or an advertised notification, notification generation module 860 can update a state counter and instruct discovery module 854 to generate the broadcast notification or the advertisement including the updated state counter value. In the case of an event notification, notification module 860 can instruct response generation module 858 to generate an unsolicited response (e.g., an EVENT message as described above) to be sent to a subscribed controller as described above. In some embodiments, notification module 860 can maintain a list of subscribed controllers for various notification mechanisms and/or various characteristics and can instigate one or more mechanisms depending on whether any controllers are subscribed. In some embodiments, the subscription information can be maintained in accessory object(s) storage element 852.

Communication interface module 870 can provide services to support communication with other devices, including controllers. In some embodiments, communication interface module 870 can implement a Bluetooth LE protocol stack 872 and/or an HTTP/IP protocol stack 874. Bluetooth LE protocol stack 872 can provide formatting of outgoing messages and interpretation of received messages in accordance with Bluetooth LE transport protocols. HTTP/IP protocol stack 874 can provide formatting of outgoing messages and interpretation of received messages in accordance with HTTP and IP transport protocols. While Bluetooth LE and HTTP/IP are used as examples, it is to be understood that any combination of transport protocols can be supported within communication interface module 870 and that a given instance of a controller can support one or more transport protocols. As described above, accessory 800 can act as a server device in a client/server model of device interaction, and Bluetooth LE protocol stack 872 and/or an HTTP/IP protocol stack 874 can be configured to support server behavior.

In some embodiments, a protocol stack within communication interface module 870 can be modified to generate certain nonstandard messages. For example, as described above, HTTP/IP protocol stack 874 can be configured to generate an unsolicited "event" message from an accessory.

In some embodiments, communication interface module 870 can provide an API that is usable by other modules to send and/or receive messages to external devices. The API can be designed to be transport-agnostic, and the selection of a transport for a particular message can be made within communication interface module 870, transparently to other modules within accessory 800. Messages received at a communication port of accessory 800 can be sent to Bluetooth LE stack 872 or HTTP/IP stack 874 based on the port configuration, and each of Bluetooth LE stack 872 and HTTP/IP stack 874 can send outgoing messages to an appropriately configured communication port.

Figure 9:
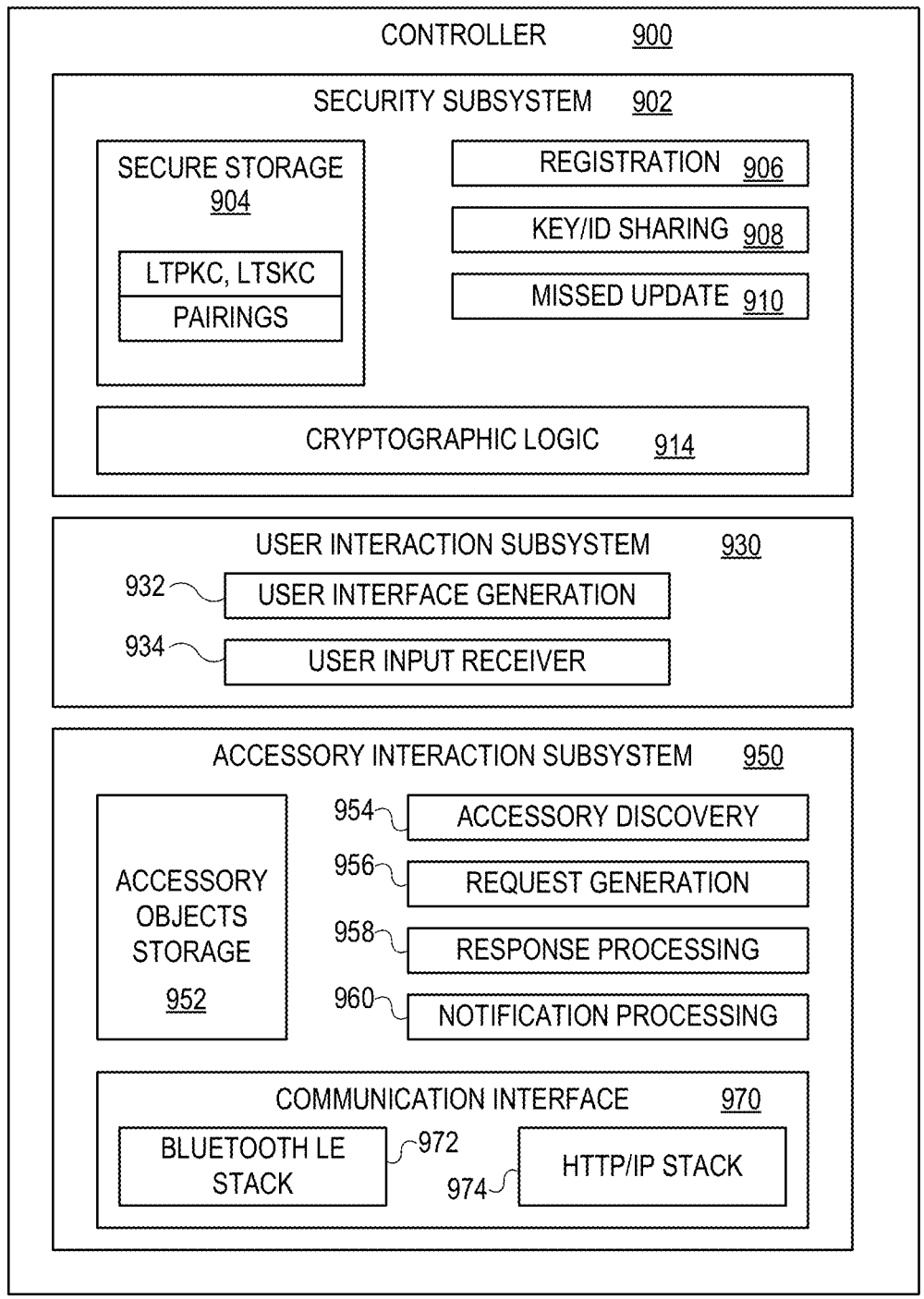
FIG. 9 is a simplified block diagram of a controller architecture according to an embodiment of the present disclosure.

FIG. 9 shows an example of a controller architecture for a controller 900 according to an embodiment of the present disclosure. The controller architecture is shown as a set of interacting subsystems, where each subsystem includes one or more modules. It is to be understood that each of the modules can be implemented using program code executing on one or more programmable processors and/or in one or more fixed-function processors and that the processor(s) can include output signaling to control other hardware devices (e.g., actuators, displays, etc.) and/or input signaling to receive signals from other hardware devices (e.g., keyboards; touchscreens; feedback or status signals from actuators, motors, or sensors; etc.). Some of the subsystems can include persistent data storage, which can be implemented using any type of nonvolatile storage device (e.g., semiconductor flash memory, EEPROM, magnetic or optical disk, etc.). Although not shown, some or all of the subsystems can include additional hardware elements, such as displays, keyboards, touchscreens, microphones, speakers, sensors, etc.

Security subsystem 902 can include secure storage element 904, registration module 906, ID sharing module 908, missed update module 910, and cryptographic logic module 914. Secure storage element 904 can be similar or identical to secure storage element 618 of FIG. 6 or other secure storage elements described above. In some embodiments, secure storage element 904 is used to securely store key information, including mappings that identify which keys have been generated for which accessories. Additionally, secure storage element 904 can store a long-term public/secret key pair for controller 900 (e.g., LTPKC, LTSKC as described above) as well as pairing records for each accessory with which controller 900 has an established pairing. As described above, each pairing record can include an identifier of a paired accessory, a long-term public key of the paired accessory, and optionally other information such as permission settings for interactions of controller 900 with the paired accessory (e.g., whether controller 900 has administrator permission). In embodiments where controller 900 uses different long-term public keys in connection with different accessories, each pairing record can also include an indicator of the long-term public key to be used with the paired accessory. Other information can be included if desired.

Registration module 906 can implement some controller portions of the accessory communication control protocol described herein. In some embodiments, registration module 906 is configured to register with an accessory by providing information that enables a secure broadcast session. Such information includes a list of instance IDs that correspond to characteristics of the accessory for which controller 900 is requesting status updates. The list of instance IDs may also include timing information (e.g., how often the accessory should report on each characteristic) as well as automation information that identifies whether the characteristic is associated with an automation (e.g., whether controller 900 is programmed to instruct another device based on the state or an update about the accessory). Registration module 906 may also provide device IDs for each accessory. In some embodiments, device IDs will be generated randomly and stored in secure storage 904. Additionally, as a security/privacy feature, device IDs may be changed regularly (e.g., based at least in part on a schedule) or at random times. Changing the device ID randomly can help keep malicious third-parties from identifying how many devices and/or what devices are within a home. In other examples, the device IDs may be rolled (e.g., changed) whenever a new key is generated and/or if malicious activity is detected or suspected. For example, malicious attack patterns may be detected or anticipated, and such detection or anticipation may trigger a device ID update.

Key/ID sharing module 908 can implement some controller portions of the accessory communication control protocol described herein. In some embodiments, key/ID sharing module 908 is configured to implement a scheme for sharing device IDs and corresponding keys with other devices (e.g., other accessories on the network or within range). This is helpful when controller 900 is configured as a hub or bases station. In this scenario, key/ID sharing module 908 can transmit accessory device IDs and associated encryption keys to all other devices within the home. In some examples, the shared information may be provided to a server (e.g., cloud service provider) that can update each device on the home network, or key/ID sharing module 908 may transmit the information directly (e.g., using a local area network (LAN), short range communication for devices within proximity, and/or relays from other devices on the network). In any event, once the information (e.g., device ID and/or keys) is shared with all of the devices, incoming broadcast notifications may also be shared. Using the key and a device-specific counter (e.g., a counter for each device on the network must be maintained by each other device on the network), all devices that receive the relayed broadcast notification will be able to decrypt the payload, update a record about the status of the changed device (e.g., the accessory that sent the initial broadcast notification), and increment the device-specific counter for the changed device. Sharing of the key/ID information by key/ID sharing module 908 also enables other accessories that might be closer to the changed device (e.g., if the changed device moves outside of the range of controller 900) to relay the broadcast notification to controller 900 and/or to decrypt the payload of the broadcast notification and transmit the status update to controller 900.

Missed update module 910 can implement some controller portions of the accessory communication control protocol described herein. In some embodiments, broadcast notifications may be missed (or spoofed/replayed by malicious third-parties). The missed (or fake) broadcast notification may be identified when the encrypted payload cannot be decrypted with a stored counter that is associated with the accessory (e.g., the accessory that originated the broadcast notification). Once this is identified, missed update module 910 may be configured to get controller 900 and the originating accessory synced again. In order to do this, missed update module 910 is configured to increment the counter by one and retry decrypting the payload of the received broadcast notification. If that does not work, missed update module 910 will continue to increment the counter, trying to decrypt the payload at each round. This can occur for some particular number of attempts (e.g., five increments) or until the devices are synced. Once the counters are synced, missed update module 910 will be able to tell how many updates were missed. Using this information, missed update module 910 can establish a secure session (e.g., a pair-verified session as described above) with the accessory, and request a log of the missed status updates. All appropriate automations, user notifications, and data table updates can be performed based at least in part on the log data, and then missed update module 910 can instruct controller 900 to revert back to the standard accessory control protocol described herein. Additionally, in some examples, controller 900 will generate a new device ID and/or generate a new key (and instruct the accessory to generate the same new key) for that accessory.

Cryptographic logic module 914 can implement cryptographic algorithms usable by controller 900. Examples include: key generation algorithms; algorithms and functions used in SRP; hash algorithms such as HKDF-SHA-512; key-based encryption/decryption algorithms such as ChaCha20-Poly1305, Curve25519, Ed25519, and/or other algorithms. In some embodiments, cryptographic logic module 914 can provide an API (application program interface) that is usable by other modules of controller 900 to invoke cryptographic algorithms and related services. Any number and combination of cryptographic algorithms and related services can be supported.

User interaction subsystem 930 can manage interactions with a user of controller 900. For example, user interface generation module 932 can generate a user interface to be presented to the user, e.g., on a display device. The user interface can include control elements operable by the user to interact with an accessory. For example, as described above, controller 900 can render a graphical user interface based on information provided in an accessory object. User input receiver module 934 can receive input from the user interface and process the input to determine an action to be taken in response to the input (e.g., generating messages to be sent to an accessory). In some embodiments, user input receiver module 934 can invoke functions of other modules of controller 900 in response to the user input.

Accessory interaction subsystem 950 can support interactions between controller 900 and an accessory. Accessory objects storage element 952 can be implemented using volatile or nonvolatile storage media (e.g., semiconductor flash memory, EEPROM, DRAM, SRAM, magnetic or optical disk, etc.). In some embodiments, accessory objects storage element 952 can be used to store a representation of each accessory for which controller 900 has information. For example, as described above, during registration or after establishing a pairing with an accessory, a controller such as controller 900 can obtain an accessory definition record from the accessory, which can include one or more accessory objects. Controller 900 can store the accessory objects thus obtained in accessory objects storage element 952. Stored accessory objects can be used in a number of ways, including generating user interfaces (e.g., by user interface generation module 932), interpreting user input (e.g., by user input receiver module 934), generating requests to an accessory, and/or receiving responses or notifications from an accessory.

Accessory discovery module 954 can perform operations related to discovering an accessory, e.g., listening to broadcasts, determining whether to pair with a discovered accessory, and so on.

Request generation module 956 can generate and send requests to accessories. For example, in response to an instruction from user input receiver module 934 (e.g., to unlock a door), request generation module 956 can generate an appropriate request message to the accessory (e.g., writing to a lock-state characteristic as described above). Examples of request messages are described above. In some embodiments, generating the message can include encrypting the message, and request generation module 956 can invoke functions supported by cryptographic logic module 914 in connection with generating the request. In some embodiments, request generation module 956 can interact with security subsystem 902 to generate and send requests to an accessory during a pair setup, pair verify, pair add, or pair remove operation.

Response processing module 958 can receive and process any responses to request messages that may be received from accessories. For example, after request generation module 956 sends a request message to an accessory (e.g., to write to a lock-state characteristic as described above), response processing module 958 can receive a response message from the accessory and can interpret the message. In some embodiments, the response message can be received in encrypted form, and response processing module 958 can invoke functions supported by cryptographic logic module 914 in connection with interpreting the response. Response processing module 958 can also provide information to user interface subsystem 930 based on the response (e.g., status codes, whether error occurred, etc.), and user interface subsystem 930 can generate feedback to the user based on this information. In some embodiments, response processing module 958 can also update accessory objects storage element 952 based on information included in the response message. In some embodiments, response processing module 958 can interact with security subsystem 902 to receive and process responses received from an accessory during a pair setup, pair verify, pair add, or pair remove operation.

Notification processing module 960 can receive and process notification messages that may be received from accessories. As described above, various notification mechanisms can be supported, and notification processing module 960 can support any or all of these notification mechanisms. For example, in the case of a passive notification, notification processing module 960 can compare a state counter value reported by the accessory to a stored state counter value (e.g., in accessory objects storage element 952) and can detect a discrepancy. In some embodiments, upon detecting a discrepancy, notification processing module 960 can instruct request generation module 956 to generate and send a request to the accessory to obtain additional state information (e.g., an updated accessory definition record or portions thereof). In the case of an advertised notification, notification processing module 960 can process advertisements received via accessory discovery module 954 to detect a known accessory with a state change (e.g., based on state counters of accessory objects stored in accessory storage element 952). In the case of an event notification, an unsolicited response message can be received by response processing module 958, which can recognize the message as an unsolicited response (e.g., an EVENT message as described above) and can provide the message to notification module 960 for further processing. Regardless of the particular notification mechanism, notification module 960 can determine the nature of the changed state information and provide appropriate information to user interaction subsystem 930. In some embodiments, notification module 960 can also update stored accessory objects in accessory objects storage element 952.

Communication interface module 970 can provide services to support communication with other devices, including accessories. In some embodiments, communication interface module 970 can implement a Bluetooth LE protocol stack 972 and/or an HTTP/IP protocol stack 974. Bluetooth LE protocol stack 972 can provide formatting of outgoing messages and interpretation of received messages in accordance with Bluetooth LE transport protocols. HTTP/IP protocol stack 974 can provide formatting of outgoing messages and interpretation of received messages in accordance with HTTP and IP transport protocols. While Bluetooth LE and HTTP/IP are used as examples, it is to be understood that any combination of transport protocols can be supported within communication interface module 970 and that a given instance of controller 900 can support one or more transport protocols. As described above, controller 900 can act as a client device in a client/server model of device interaction, and Bluetooth LE protocol stack 972 and/or an HTTP/IP protocol stack 974 can be configured to support client behavior.

In some embodiments, a protocol stack within communication interface module 970 can be modified to recognize certain nonstandard messages. For example, as described above, HTTP/IP protocol stack 974 can be configured to recognize an unsolicited "event" message from an accessory.

In some embodiments, communication interface module 970 can provide an API that is usable by other modules to send and/or receive messages to external devices. The API can be designed to be transport-agnostic, and the selection of a transport for a particular message can be made within communication interface module 970, transparently to other modules within controller 900. Messages received at a communication port (not shown) of controller 900 can be sent to Bluetooth LE stack 972 or HTTP/IP stack 974 based on the port configuration, and each of Bluetooth LE stack 972 and HTTP/IP stack 974 can send outgoing messages to an appropriately configured communication port.

It will be appreciated that the system configurations and components described herein are illustrative and that variations and modifications are possible. It is to be understood that an implementation of controller 600 (or controller 900) can perform any or all of the operations described above as being performed by a controller and that an implementation of accessory 700 (or accessory 800) can perform any or all of the operations described above as being performed by an accessory; the use of different reference numbers in connection with different drawings is not intended to imply otherwise. A controller and/or an accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

In some embodiments, the accessory can notify any controllers of changes in its state. For example, any combination of passive notification processes, broadcast notification processes, active notification processes, and/or event-message notification processes can be supported. In some embodiments, a controller can send a request to the accessory to subscribe to a particular notification method (e.g., advertised, active, and/or event-message) with regard to a specific characteristic. The accessory can maintain subscription status information for various controllers and can generate notifications of a particular type based on the current subscription status.

Further Embodiments

While the disclosure has been described with respect to specific embodiments, one skilled in the art will recognize that numerous modifications are possible. A single controller can use processes described herein to establish pairings with any number of accessories and to selectively communicate with different accessories at different times. Similarly, a single accessory can be controlled by multiple controllers with which it has established pairings (e.g., using pair setup and pair add as described above). Any function of an accessory can be controlled by modeling the function as a service having one or more characteristics and allowing a controller to interact with (e.g., read, modify, receive updates) the service and/or its characteristics. Accordingly, protocols and communication processes as described herein can be "uniform," meaning that they can be applied in any context with one or more controllers and one or more accessories regardless of accessory function or controller form factor or specific interfaces.

Further, some examples above make specific reference to HTTP, a protocol that can be used over local-area and wide-area networks that support a standard internet-protocol (IP transmission stack (e.g., TCP/IP). However, other transmission protocols can also be used. For example, the Bluetooth LE protocol stack includes a generic attribute (GATT) layer that allows one device to interrogate and modify attributes of another device. In some embodiments, instances of accessory characteristics can be exposed to controllers as attributes based on the GATT model. Accordingly, a controller can also interrogate (e.g., read) and modify (e.g., write) accessory characteristics using Bluetooth LE. In some embodiments, a particular accessory can support either or both of IP and/or Bluetooth LE transmission protocols, and a controller can interact with some accessories using IP and other accessories using Bluetooth LE, depending on the accessory's capabilities and on preferences established by the controller.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A computer-readable storage medium having stored thereon program instructions that, when executed by one or more processors of a computing device, cause the computing device to perform instructions comprising:
    transmitting information that identifies a characteristic of an accessory device about which to report status information;
    transmitting a device identifier to the accessory device;
    maintaining a device counter value;
    receiving, from the accessory device, a broadcast notification that includes at least the device identifier, an accessory counter value, and the status information of the accessory device;
    decrypting the broadcast notification based at least in part on the device counter value;
    extracting the status information; and
    performing an operation based at least in part on the status information.

2. The computer-readable storage medium of claim 1, wherein the broadcast notification is decrypted further based at least in part on a key.

3. The computer-readable storage medium of claim 2, wherein the key is shared with the accessory device.

4. The computer-readable storage medium of claim 2, wherein the instructions further comprise generating the key based at least in part on a hashing algorithm that is shared with the accessory device.

5. The computer-readable storage medium of claim 1, wherein the operation comprises directing a control instruction to at least a second accessory device.

6. The computer-readable storage medium of claim 1, wherein the operation comprises incrementing the device counter value.

7. The computer-readable storage medium of claim 1, wherein the instructions further comprise confirming accuracy of the broadcast notification based at least in part on the device identifier.

8. The computer-readable storage medium of claim 1, wherein the instructions further comprise generating the device identifier.

9. The computer-readable storage medium of claim 8, wherein the device identifier is randomly generated.

10. The computer-readable storage medium of claim 1, wherein the instructions further comprise:
    detecting a replay attack;
    generating a new device key; and
    instructing the accessory device to generate a new accessory key.

11. The computer-readable storage medium of claim 10, wherein the replay attack is detected based at least in part on determining that the accessory counter value received in the broadcast notification corresponds to a previous device counter value.

12. The computer-readable storage medium of claim 1, wherein the instructions further comprise storing an association between the device identifier and an accessory identifier corresponding to the accessory device.

13. The computer-readable storage medium of claim 12, wherein the accessory identifier comprises a media access control (MAC) address of the accessory device.

14. The computer-readable storage medium of claim 1, wherein the instructions further comprise, prior to extracting the status information, authenticating the broadcast notification.

15. The computer-readable storage medium of claim 14, wherein the broadcast notification further includes an accessory authentication tag, and wherein authenticating the broadcast notification comprises:
    generating a device authentication tag;
    comparing the device authentication tag with the accessory authentication tag; and
    confirming that the broadcast notification was not altered based at least in part on the device authentication tag matching the accessory authentication tag.

16. The computer-readable storage medium of claim 15, wherein the device authentication tag is generated using a hash that is shared with the accessory device.

17. The computer-readable storage medium of claim 1, wherein the instructions further comprise transmitting an acknowledgement receipt to the accessory device at least in response to receipt of the broadcast notification.

18. A method, comprising:
    transmitting, by a computing device, information that identifies a characteristic of an accessory device about which to report status information;
    transmitting, by the computing device, a device identifier to the accessory device;
    maintaining, by the computing device, a device counter value;
    receiving, from the accessory device, a broadcast notification that includes at least the device identifier, an accessory counter value, and the status information of the accessory device;
    decrypting, by the computing device, the broadcast notification based at least in part on the device counter value;
    extracting, by the computing device, the status information; and
    performing, by the computing device, an operation based at least in part on the status information.

19. The method of claim 18, wherein the broadcast notification is decrypted further based at least in part on a key.

20. The method of claim 19, wherein the key is shared with the accessory device.

21. The method of claim 19, wherein the instructions further comprise generating the key based at least in part on a hashing algorithm that is shared with the accessory device.

22. A computing device, comprising:

memory configured to store computer-executable instructions; and one or more processors coupled to the memory and configured to execute the computer-executable instructions to at least:

transmit information that identifies a characteristic of an accessory device about which to report status information;

transmit a device identifier to the accessory device;

maintain a device counter value;

receive, from the accessory device, a broadcast notification that includes at least the device identifier, an accessory counter value, and the status information of the accessory device;

decrypt the broadcast notification based at least in part on the device counter value;

extract the status information; and perform an operation based at least in part on the status information.

\* \* \* \* \*